United States Patent
Nielsen et al.

(10) Patent No.: US 9,082,126 B2
(45) Date of Patent: Jul. 14, 2015

(54) SERVICE PLAN WEB CRAWLER

(75) Inventors: Aaron David Nielsen, North Vancouver (CA); Sergey Sirotkin, Port Moody (CA)

(73) Assignee: National Electronics Warranty, LLC, Sterling, VA (US)

(*) Notice: Subject to any disclaimer, the term of this patent is extended or adjusted under 35 U.S.C. 154(b) by 434 days.

(21) Appl. No.: 12/851,447

(22) Filed: Aug. 5, 2010

(65) Prior Publication Data
US 2011/0078487 A1 Mar. 31, 2011

Related U.S. Application Data

(60) Provisional application No. 61/245,923, filed on Sep. 25, 2009, provisional application No. 61/272,707, filed on Oct. 23, 2009.

(51) Int. Cl.
G06F 17/30 (2006.01)
G06Q 30/02 (2012.01)

(52) U.S. Cl.
CPC ............ *G06Q 30/02* (2013.01); *G06Q 30/0243* (2013.01); *G06Q 30/0246* (2013.01); *G06Q 30/0251* (2013.01); *G06Q 30/0277* (2013.01)

(58) Field of Classification Search
CPC .................................................... G06Q 30/02
USPC ......... 707/706, 707, 708, 709, 710, 713, 722, 707/736, 758, 781, 999.005–999.006; 705/27
See application file for complete search history.

(56) References Cited

U.S. PATENT DOCUMENTS

| | | | |
|---|---|---|---|
| 7,949,646 B1* | 5/2011 | Bangalore et al. | 707/708 |
| 2002/0188527 A1* | 12/2002 | Dillard et al. | 705/27 |
| 2003/0028451 A1* | 2/2003 | Ananian | 705/27 |
| 2003/0110158 A1* | 6/2003 | Seals | 707/1 |
| 2003/0206554 A1* | 11/2003 | Dillon | 370/432 |
| 2004/0117383 A1* | 6/2004 | Lee et al. | 707/100 |
| 2005/0108775 A1* | 5/2005 | Bachar et al. | 725/135 |
| 2006/0004647 A1* | 1/2006 | Srinivasamurthy et al. | 705/37 |
| 2006/0212350 A1* | 9/2006 | Ellis et al. | 705/14 |
| 2007/0288514 A1* | 12/2007 | Reitter et al. | 707/104.1 |
| 2008/0072139 A1* | 3/2008 | Salinas et al. | 715/238 |
| 2008/0077471 A1* | 3/2008 | Musgrove et al. | 705/10 |
| 2008/0221987 A1* | 9/2008 | Sundaresan et al. | 705/14 |
| 2009/0210407 A1* | 8/2009 | Freire et al. | 707/5 |
| 2009/0248672 A1* | 10/2009 | McIntire et al. | 707/5 |
| 2010/0042931 A1* | 2/2010 | Dixon et al. | 715/738 |

(Continued)

OTHER PUBLICATIONS

CES Award Plaque of 2010.
CES website page Jun. 11, 2010 http:/www.cesweb.org/awards/innovations/2010honorees.asp?category=931397.
Business Wire website page Jun. 11, 2010 http://www.businesswire.com/portal/site/home/permalink/?ndmViewId=news_view&newsId=20100105006253&newsLang=en.

*Primary Examiner* — Syling Yen
(74) *Attorney, Agent, or Firm* — Hogan Lovells US LLP

(57) ABSTRACT

A web crawler for downloading and analyzing the contents of a merchant's website. The web crawler may analyze the products advertised and determine whether a service plan is properly associated. The crawler may also analyze the placement of the service plans on the website, and store the information in a database. A dynamic mapper is also provided which can determine what service plan should be associated with a particular product. The dynamic mapper may also suggest what type of control to use for a particular customer. A webserver containing software for updating a webpage is also disclosed. A process for updating a webpage is also disclosed.

33 Claims, 18 Drawing Sheets

(56) References Cited

U.S. PATENT DOCUMENTS

2010/0183132 A1* 7/2010 Satyavolu et al. ......... 379/114.1
2010/0185452 A1* 7/2010 Satyavolu et al. ............. 705/1.1
2010/0185454 A1* 7/2010 Satyavolu et al. ............. 705/1.1

* cited by examiner

SpiderSense

| Report | Explorer | Filters | Statistics | Status | Administration |

Summary

| Total SKUs | Total SKUs with Plan | Total Categories | Total Pages | Traffic Size | Total Cache Size |
|---|---|---|---|---|---|
| 144921 | 56811 (39%) | 4875 | 725858 | 7.59 GB (21%) | 35.63 GB |

Snapshots

| SKUs | SKUs with Plan | Categories | Pages | Cache Size | Traffic Size | Crawl Start Date | Crawl End Date |
|---|---|---|---|---|---|---|---|
| 183 | 72 (39%) | 2 | 895 | 98.38 MB | 21.39 MB (22%) | 1/30/2009 11:38:16 PM | 5/15/2009 10:15:25 PM |
| 181 | 69 (38%) | 3 | 753 | 82.71 MB | 18.00 MB (22%) | 1/30/2009 11:38:21 PM | 5/15/2009 10:07:50 PM |
| 135 | 53 (39%) | 2 | 610 | 67.08 MB | 14.58 MB (22%) | 1/30/2009 11:42:36 PM | 5/15/2009 10:06:23 PM |
| 99 | 45 (45%) | 1 | 492 | 54.28 MB | 11.80 MB (22%) | 1/30/2009 11:43:05 PM | 5/15/2009 10:03:17 PM |
| 10 | 5 (50%) | 0 | 68 | 7.49 MB | 1.63 MB (22%) | 2/7/2009 6:45:31 AM | 5/15/2009 9:53:03 PM |
| 6 | 1 (17%) | 0 | 60 | 6.61 MB | 1.44 MB (22%) | 2/7/2009 7:22:52 AM | 5/15/2009 10:06:57 PM |
| 10 | 5 (50%) | 0 | 54 | 5.99 MB | 1.31 MB (22%) | 2/7/2009 7:23:00 AM | 3/28/2009 2:49:28 AM |
| 3 | 0 (0%) | 0 | 48 | 5.35 MB | 1.17 MB (22%) | 2/7/2009 7:23:06 AM | 5/15/2009 10:00:08 PM |
| 1 | 0 (0%) | 0 | 13 | 1.50 MB | 326.35 MB (22%) | 2/22/2009 4:11:38 AM | 3/8/2009 7:46:34 AM |
| 0 | 0 (0%) | 0 | 12 | 1.41 MB | 304.11 MB (22%) | 2/22/2009 4:12:49 AM | 3/8/2009 7:46:36 AM |

1 2 3 4 5 6 7 8

© N.E.W. North America, Corp All rights reserved

FIG. 12

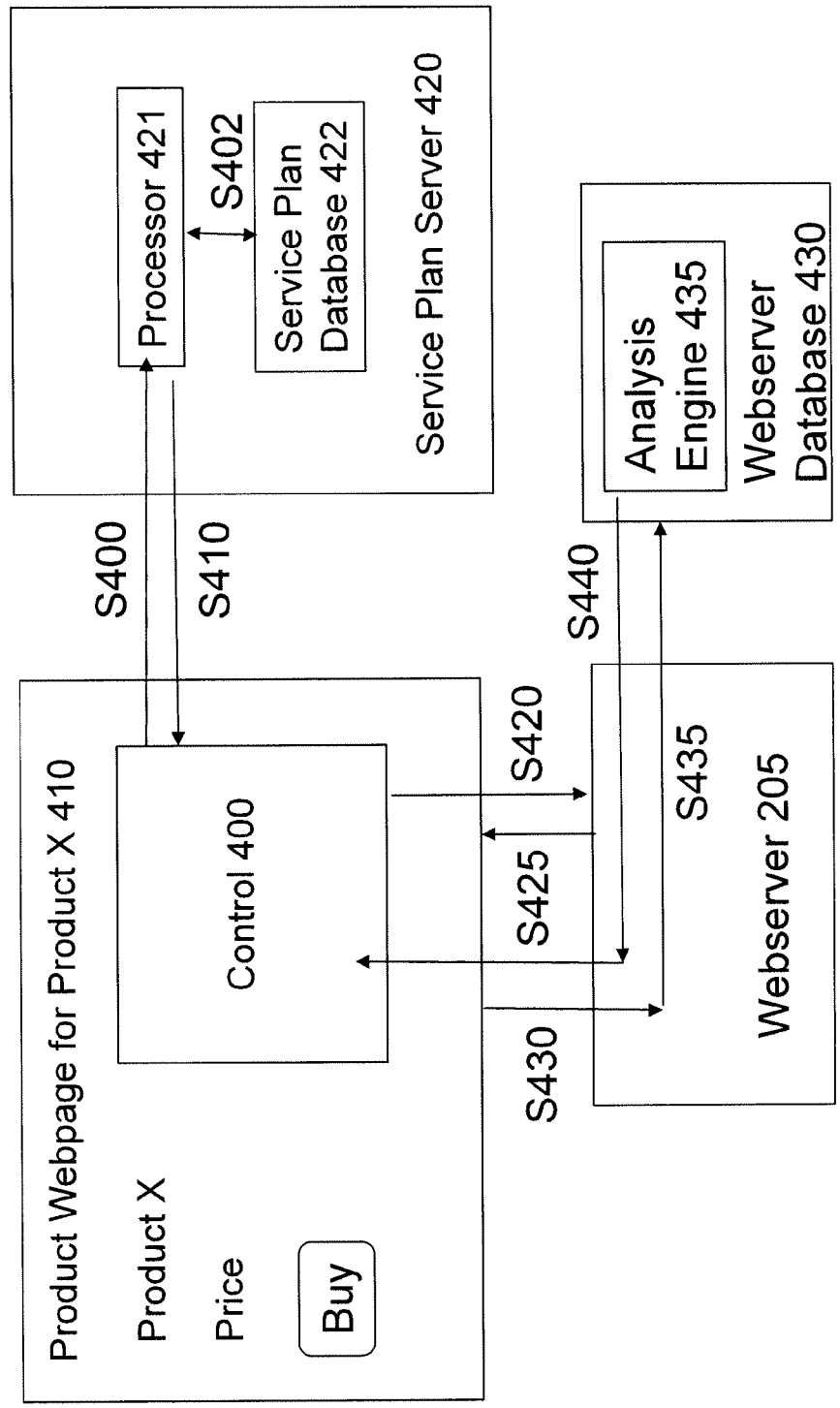

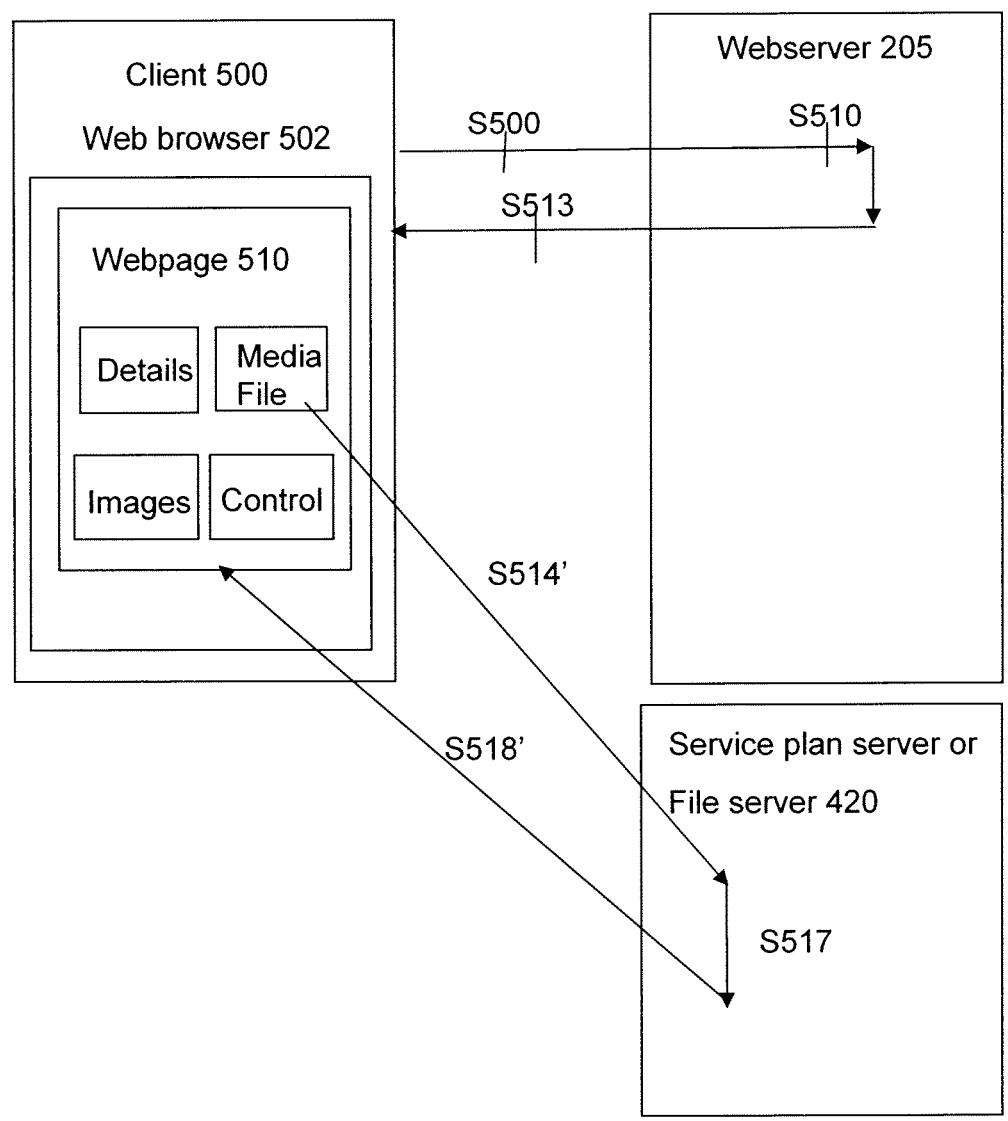

SERVICE PLAN WEB CRAWLER

PRIORITY

This application claims the benefit of priority to U.S. Provisional Application 61/245,923 (filed Sep. 25, 2009) and 61/272,707 (filed Oct. 23, 2009); both of which are incorporated by reference in their entirety.

BACKGROUND OF THE INVENTION

Current trends in the market place have influenced merchants to include service plans for many of their products. Sometimes the service plans are offered directly by a merchant, such as BestBuy's GeekSquad and Office Depot's Tech Depot Services, and in other cases a third party may fulfill a merchant's service plan obligations. Customers may purchase these services to receive additional support for their product, ideally increasing their use and enjoyment of it.

Online merchants associate products with service plans or warranties so that a customer can buy an extended warranty or service plan when he or she purchases a product. Sometimes, however, a product should be listed as having a service plan, but an error in the listing causes the webpage on which the product is listed to not offer a service plan. Consequentially, the online merchant would not, in this case, offer the service plan to the customer. In other cases, the website of the online merchant may associate the product with an incorrect service plan. Because the sale of warranties or service plans may be a significant source of revenue for the merchant, merchants often expend considerable resources in checking their websites for mismatched warranties and products not having an associated warranty.

SUMMARY OF THE INVENTION

One aspect of the present invention may relate to providing a web crawler which can identify missing or misassociated service plans or warranties. A second aspect of the present invention may relate to providing a dynamic mapper for determining what service plan should be associated with a particular product. In an embodiment of the web crawler configuration, the web crawler may be constructed so that it follows links on a merchant's website to find at least one product on a merchant's webpage, identifies which service plan is associated with that product, and determines whether the correct service plan has been associated with the product. Additional features of the web crawler embodiment may include a placement analyzer for determining where on the webpage the warranty is located, and whether the placement is easily visible to the customer. Another feature the web crawler may provide is a class generator for populating a relational database with information downloaded by the web crawler. Moreover, the web crawler may contain a smart crawling routine for preventing the web crawler from crawling blacklisted webpages. Other features of the web crawler may include a throttle controller for managing the web crawler's impact and strain on the merchant's website, and an error checking routine for tracking errors returned by the website.

In an embodiment of a dynamic mapper configuration, a dynamic mapper is disclosed which allows a merchant to automatically map service plans to product webpages. This technique allows the merchant to avoid having to manually map the service plans with the product webpage, which may increase costs in personnel and also increase the number of incorrectly paired service plans to product pages. In an embodiment of the dynamic mapper, the merchant may send the dynamic mapper a request to add a product webpage to the merchant's website. The dynamic mapper may analyze the product to be added, and return content to the merchant. In some embodiments, the content may simply be information regarding the service plan (such as a warranty SKU). In other embodiments, the dynamic mapper may return an advertisement for the service plan itself. In the latter case, the merchant may incorporate the advertisement directly into the product webpage. If there is no service plan associated with the product webpage, the dynamic mapper may determine that no service plan should be included. The dynamic mapper may be able to determine whether the product should have a warranty by comparing product information, category, bread crumbs, and price info (etc.) against a set of previously collected data. This previously collected data may be used to allow the dynamic mapper to implement a Bayesian filter. An implementation of this filter may allow the dynamic mapper to determine whether the product webpage it is currently analyzing should have a service plan based on whether or not similar product webpages have a service plan. Alternatively or in addition, the dynamic mapper could use a rule-based engine to determine whether a particular product webpage should have a service plan. Once the service plan or service plans are identified, the dynamic mapper may return the service plan information back to the merchant. In some embodiments, the service plan may be identified simply by an identifier unique to each service plan (e.g. a warranty SKU).

In an embodiment of the webserver, a webserver may be provided which contains instructions or software stored on computer readable media (hard drive/optical drive) and a processor (e.g. Intel or AMD microprocessor) for causing the webserver to perform a series of steps. The webserver may receive a request for a webpage containing details on a particular product from a client executing a web browser; determine the web browser version and type; and determine from the version and type whether the web browser supports asynchronous page loading. If the webserver determines that asynchronous page loading is supported by the web browser, the instructions in the computer readable media may cause the webserver to send a copy of the requested webpage to the client; send an update request to a file server; receive updated information to the file server; format the information from the file server so that it may be displayed by the web browser of the client; and send the formatted information to the web browser of the client. If the webserver determines that asynchronous page loading is not supported by the web browser, the instructions in the computer readable media may cause the webserver to send a request to the client to determine whether a media player such as Adobe Flash Media Player is installed. If the media player is installed, the instructions in the storage media of the webserver may cause the webserver to: send a webpage to the client containing details about a product, a control, and a media file; receive a transmission from a program executing the media file at the client; said transmission containing a request for updated information; send the request for updated information to the file server; receive a response from the file server which contains data; format the data so that it may be viewed by the web browser; and return the formatted data to the client.

In yet another configuration, the client, webserver, and server could be configured so that the service plan server sends updated information directly to the client (bypassing the webserver). One way to accomplish this configuration would be to instruct the webserver to send a script to the client. Upon execution of the script, the client may send a request to the service plan server for service plan information.

In the two preceding paragraphs discussing webserver, client, and service plan topology, configurations of the invention may be constructed which are not limited to service plans or products. For example, the above topology may be used to update news articles, sports scores, directories, or other webpages which may need to be updated depending on the particular client requesting the information, or need to be updated on a frequent basis.

These and additional features are described in more detail in the detailed description of the invention.

BRIEF DESCRIPTION OF THE FIGURES

Figure 3:
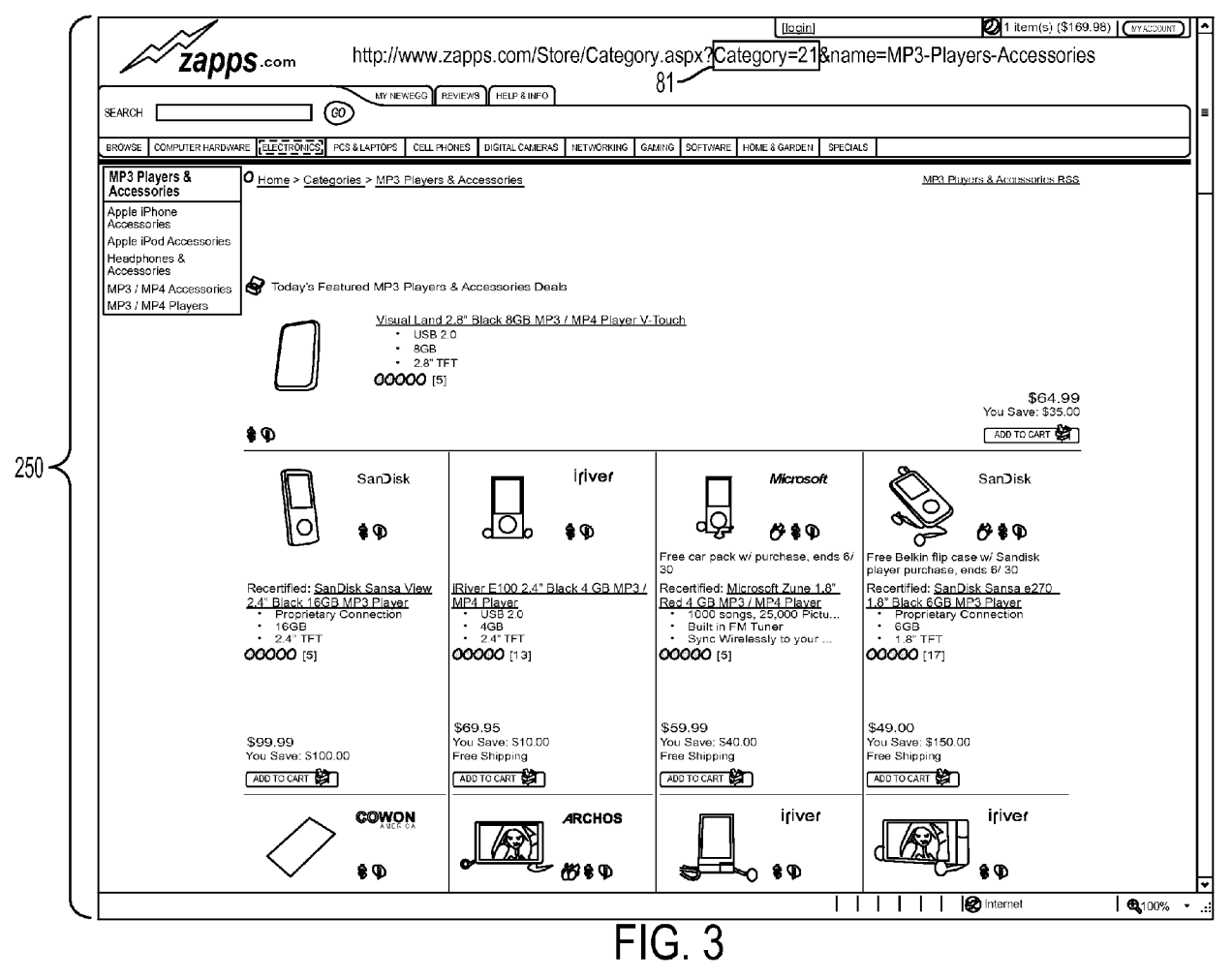

FIG. 3: is a screenshot of a category webpage of a merchant.

FIG. 6: is a screenshot of a quasi category webpage of a merchant.

FIG. 8: is a screenshot of an example of the output of the interface output.

FIG. 9: is a screenshot of an example of the output of the interface output.

FIG. 10: is a screenshot of an example of the output of the interface output.

FIG. 12: is a screenshot of an example of the output of the interface output.

FIG. 13: is a schematic view of the dynamic mapper.

FIG. 14E: is a flow diagram illustrating a second embodiment of how information may be sent between a client, webserver, and file server if the client's web browser does not natively accept asynchronous page loading.

DETAILED DESCRIPTION OF THE FIGURES

Figure 1:
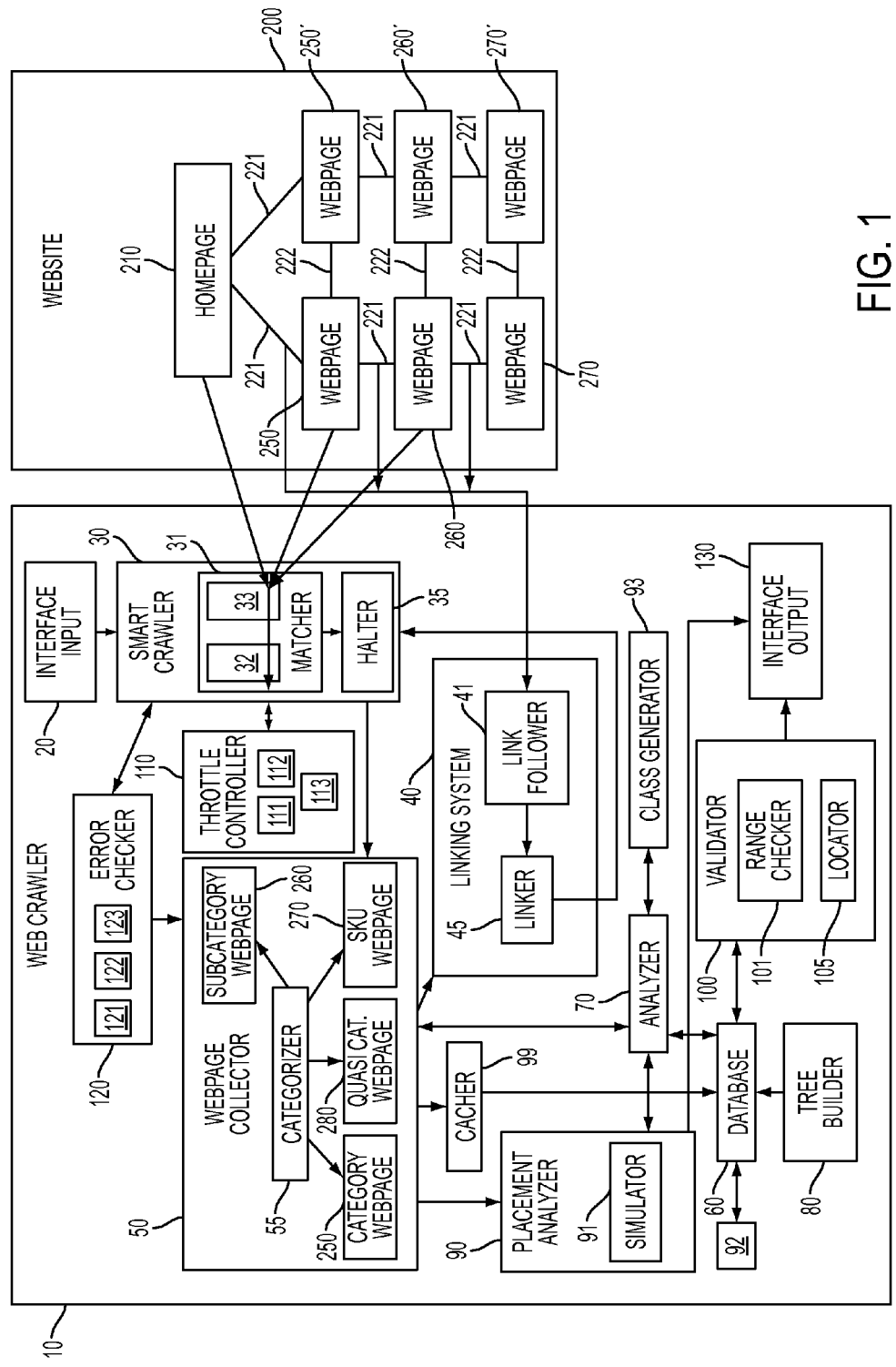
FIG. 1: is a schematic view of an embodiment of the present invention.

FIG. 1 illustrates a schematic view of the web crawler 10. The web crawler has many utilities including, for example, allowing a user to learn which products on a merchant's website are correctly paired with a service plan, and whether the service plan is sufficiently visible to the customers browsing the webpages of the merchant's website. A service plan is generally an agreement between the customer and a service plan provider to repair or replace a product if a prespecified condition occurs (e.g. the product breaks, wears down, etc.) A warranty is a type of service plan. The web crawler 10 may be stored on computer readable media (such as memory or an optical or magnetic disc) and take the form of computer executable instructions or software that a computer can execute to generate an instance of the webcrawler object. The computer may contain a processor, hard drive, motherboard, I/O connections, memory, or other typical hardware. The web crawler 10 may contain an interface input 20 which can accept inputs from a user or another computer. For example, the interface 20 may allow a user to enter a URL of a homepage 210 of a desired webpage the user would like the web crawler 10 to analyzer. The interface 20 may contain a control or button for instructing the web crawler 10 to execute one or more the routines shown in FIG. 1. For example, the interface may contain a webpage collector control and/or an analyzer control. In some embodiments, multiple routines may be combined into one control. The interface output 130 may contain inputs for receiving information from other routines (e.g. the placement analyzer 90 or validator 100), and may be able to use information from these routines to generate an output for displaying results generated by the web crawler. An exemplary set of screenshots representing an embodiment of the invention is shown in FIGS. 8-12. Interface output 130 may be a monitor or other display device, a printer, or a sound emission device. Interface 20 may send a request to the webpage collector 50 to tell the retriever to collect webpages from the merchant's website 200. (The homepage 210 of zapps.com—an exemplary retailer—is shown as an example in FIG. 2). As shown in FIG. 1, vertical links 221 connect the homepage 210 to the webpages 250 and 250' (which may be category webpages), while a horizontal link 222 links webpage 250 to webpage 250'. Similarly in FIG. 2, vertical link 221 links the homepage 210 to category webpage 250, FIG. 3 (the link to mp3 players is indicated).

The web crawler 10 may also contain a smart crawler 30 for minimizing the number of webpages the downloader needs to download. The smart crawling routine 30 may contain a blacklist and/or a whitelist of items. A matcher 31 may contain a blacklist routine 32 or a whitelist routine 33, or both. The matcher 31 will attempt to match breadcrumbs 76, the name of the product 71, etc. (see FIG. 5) against the terms in the blacklist or whitelist. In the blacklist routine 32, if the matcher 31 determines there is a match, the matcher 31 will allow the webpage collector 50 to save the webpage information in the database, but it will instruct a halter 35 which, if any item in the blacklist matches a breadcrumb, causes the smart crawler to download the current webpage and instructs the web crawler to avoid following any further links from the current webpage. In other embodiments, if the matcher 31 determines that some product information matches the blacklist, the matcher 31 will instruct the halter 35 to prevent the webpage collector from saving the webpage in the database 60. In whitelist routine 33, the matcher 31 will determine whether any of the product information matches any term in the whitelist. If the matcher 31 determines there is a match, the matcher 31 will allow the webpage collector 50 to save the webpage information, but if there is no match, the matcher 31 will instruct the halter 35 to prevent the current webpage from being saved. The smart crawler may also interact with a cacher 99 which saves copies of the webpages into the database 60. The amount of caching performed may be set by the user via interface input 20.

Figure 4:
FIG. 4: is a screenshot of a subcategory webpage of a merchant.

The web crawler 10 may contain a linking system 40 which may contain a link follower 41 and a linker 45. The link follower 41 may retrieve and follow links 221-222 from the homepage 210 or from the webpage 250 or 250' to other additional webpages 260 and 260' (which may be subcategory webpages). FIG. 4 illustrates a subcategory webpage. A linker 45 may determine whether a particular link should be followed by matching a part of the link's URL against a regular expression. For example, the words "category" 81, "subcategory" 82, "product" 83, or "catprop" may be used as terms to match against the URL to determine the type of page. Also, the linker 45 may monitor the sequence of links to determine the type of page (often webpages progress from homepage 210→category page 250→subcategory page 260→product page 270), or the linker 45 may rely on information determined from analyzer 70 such as breadcrumbs 76 (See FIG. 5) to determine the type of page currently being analyzed.

Figure 6:
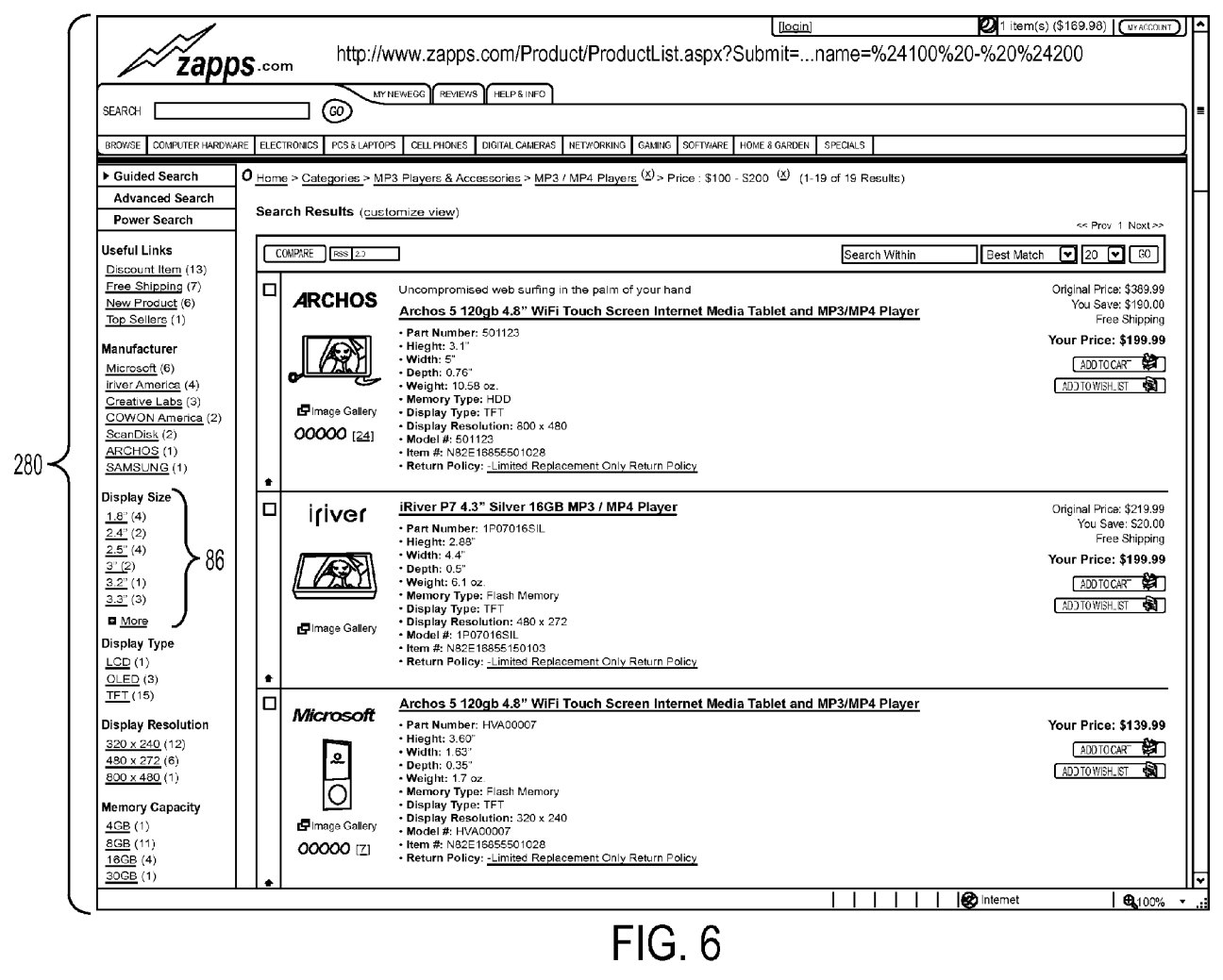

The web crawler 10 may also contain a webpage collector 50 for collecting a current webpage associated with at least one of the links retrieved from the linking system. The collector may contain a categorizer 55 for categorizing the webpage as a category webpage 250, a quasi category webpage 280 (FIG. 6), or a SKU or product webpage 270. Quasi category webpages may provide products within a certain price range 84, brand 85, or size 86 for example (See FIGS. 4 and 6). In some embodiments categorizer may rely on information from analyzer 70 to help determine the type of webpage being collected.

Figure 7:
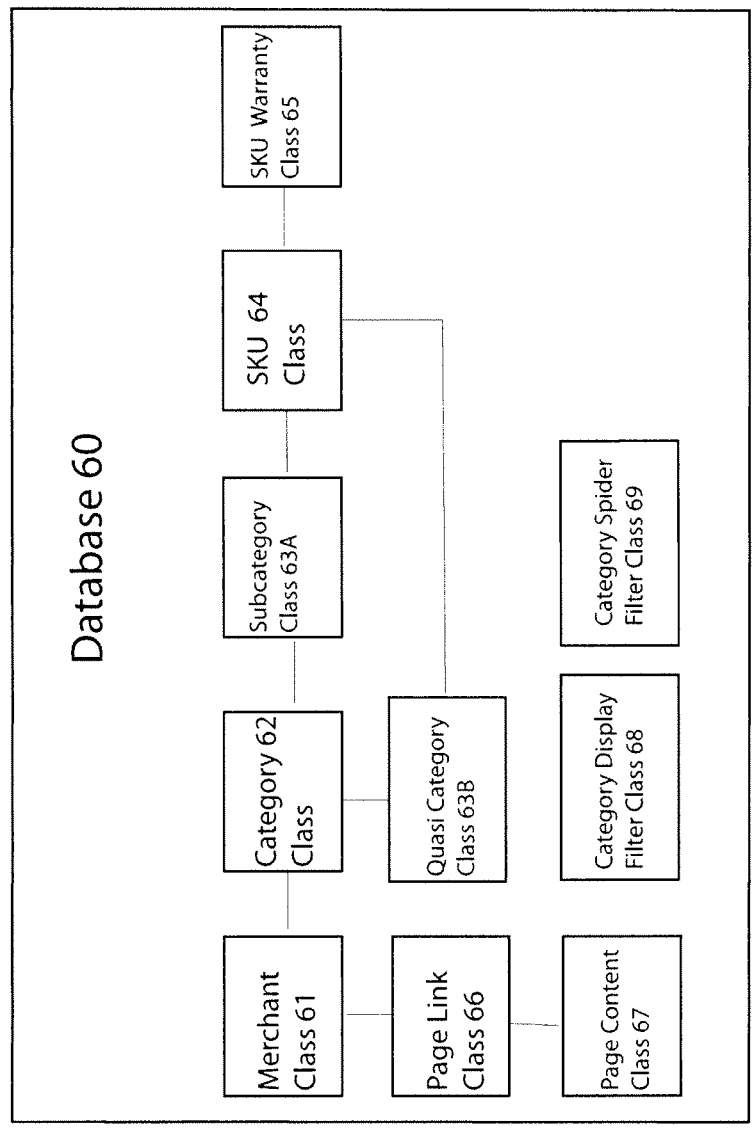
FIG. 7: is a schematic view of a database designed to be used with an embodiment of the present invention.

The web crawler 10 may also contain a database 60 for storing webpages 250 retrieved from webpage collector 50. An enlarged view of the database 60 is shown in FIG. 7. A garbage collector 92 may remove unnecessary or empty classes in the database. In some embodiments a relational database may be used, and the database may comprise a number of classes such as a merchant class 61, category class 62, subcategory class 63A, quasi category class 63B, SKU class 64, SKU warranty class 65, page link class 66, page content class 67, category display filter class 68 (used for filtering down categories in the website), category spider filter class 69 (used for blacklisting certain specified websites). A class generator 93 may work in conjunction with the analyzer 70 to build classes based upon the information determined by analyzer 70. A tree builder 80 may be used to establish relationships or links between these classes. For example, in the embodiment shown in FIG. 7, the merchant class 61 is linked to the category class 62 and the page link class 66. The category class 62 is liked to the subcategory class 63A and the quasi category class 63B, the subcategory class 63A and the quasi category class 63B are linked to the SKU class 64. The SKU class is linked to the SKU warranty class. The page link class 66 is linked to the page content class 67.

Figure 2:
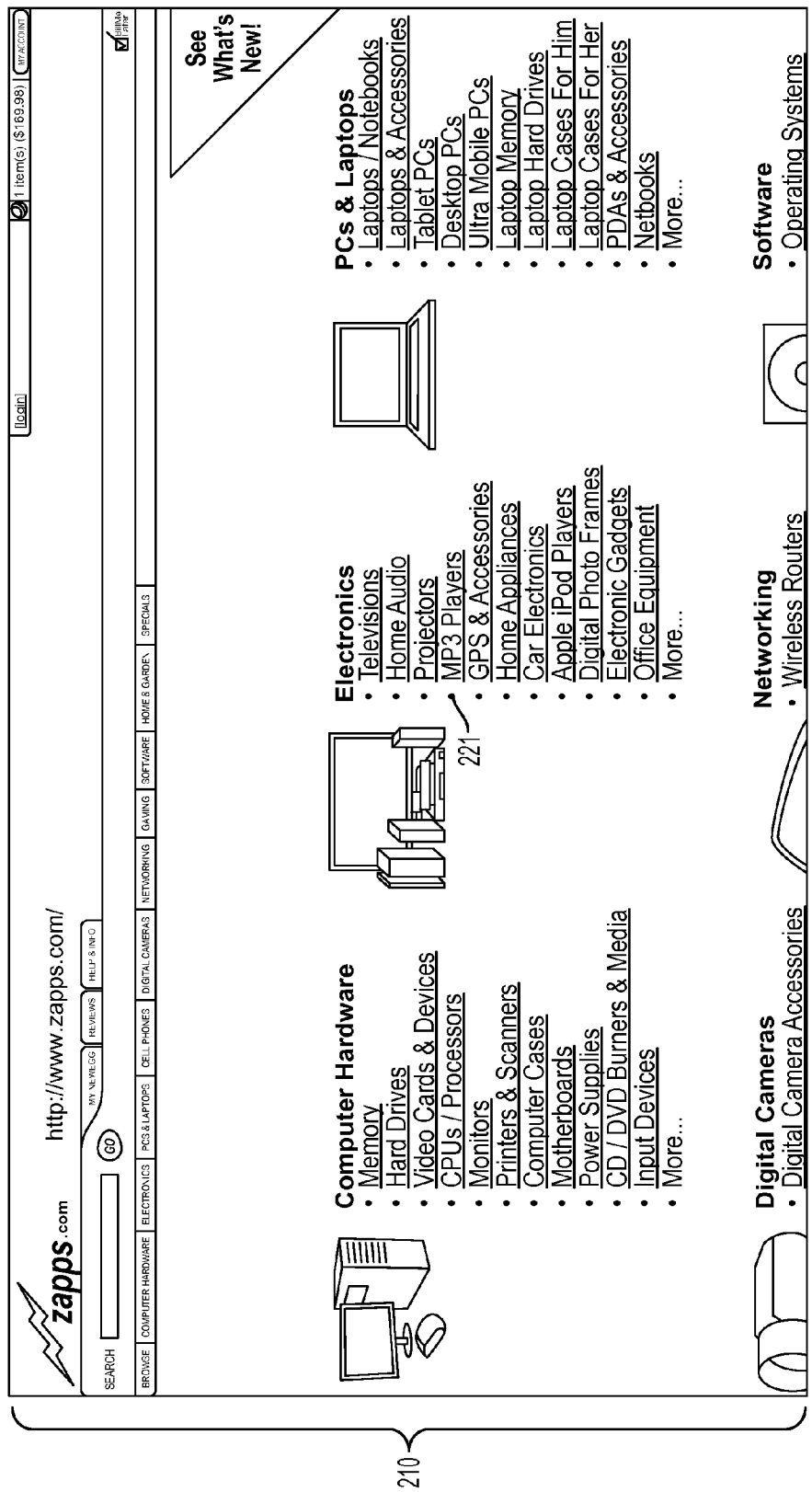
FIG. 2: is a screenshot of a merchant's homepage.
Figure 5:
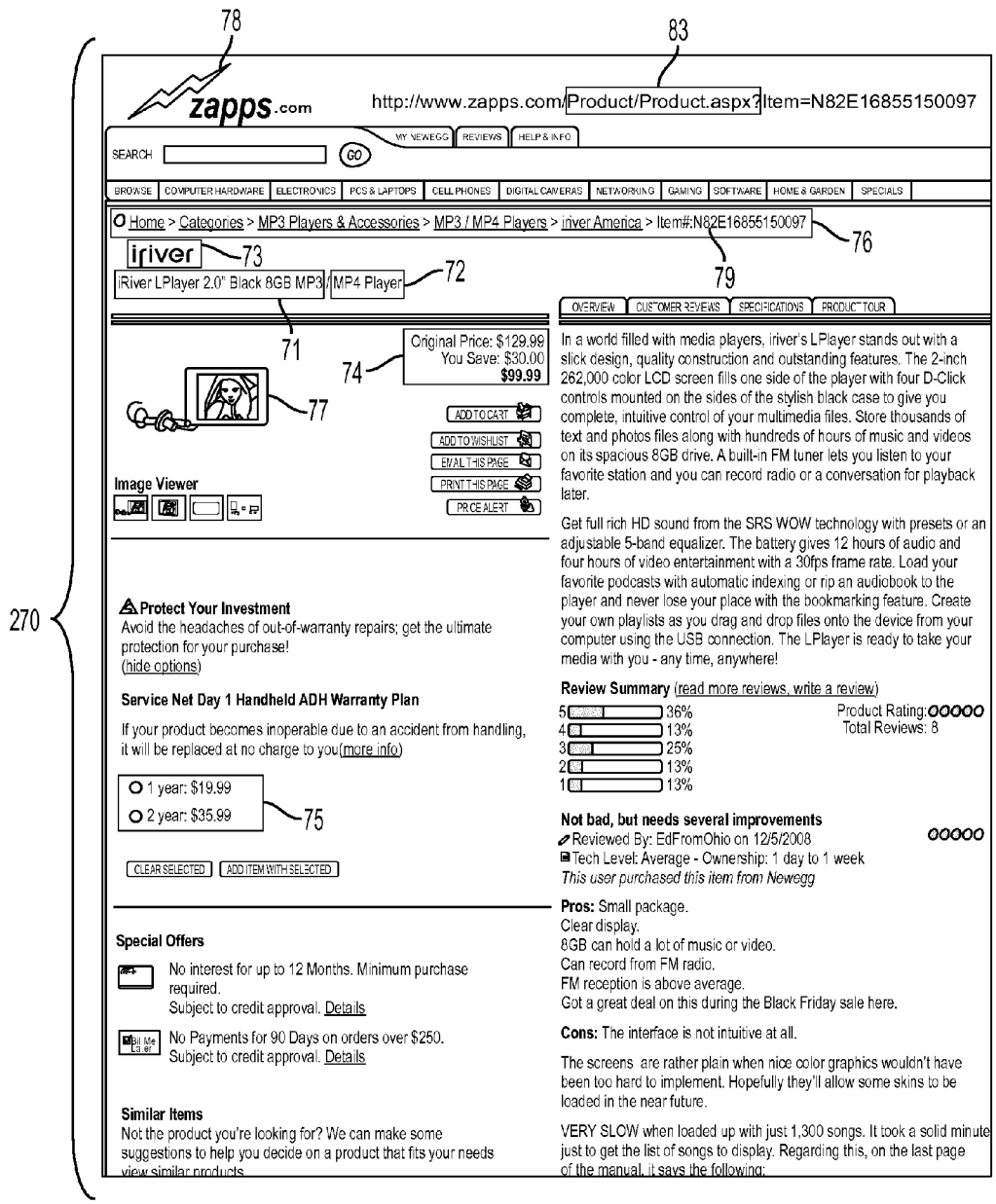
FIG. 5: is a screenshot of a product webpage of a merchant.

The web crawler 10 may also contain an analyzer 70 for collecting information about a particular product. Referring to FIG. 5, the analyzer can collect a name of the product 71, a category 72 and subcategory 73 of the class, pricing information on the product 74, pricing information relating to a service plan of the product 75, breadcrumbs 76, and images of the product 77. In FIG. 2, the analyzer 70 (of FIG. 1) has identified all seven types of information. Once identified, the analyzer may store this information in the database 60. Breadcrumbs 76 provide contextual information for location of the product within a product page. As shown in FIG. 5, the breadcrumbs are "Home>Categories>MP3 Players & Accessories>MP3/MP4 Players>iRiver America>Item#: N82E16855150095." On some webpage such as the one shown, the breadcrumbs 76 also provide the SKU 79, the category 72, and the subcategory 73 information. The analyzer may collect information such as the name of the merchant 78 from either the URL or merchant logo, and the SKU 79.

The web crawler 10 may also contain a placement analyzer 90 for determining the quality of placement and location of the service plan on the current webpage. The placement analyzer 90 may have a simulator 91 for determining the service plan's visibility on the current webpage through simulating human interaction with the webpage to enable the analyzer 90 to locate placement of the service plan on the SKU webpage 270, in a shopping cart, in a popup window, light box, or in a related items window (i.e. a window which suggests products other customers also bought.) In some embodiments, the placement analyzer may contain instructions for causing the web crawler 10 to determine whether the service plan is placed before the bend of a webpage (i.e. is the service plan visible on a customer's screen without requiring the customer to scroll the screen?).

The web crawler 10 may also contain a validator 100 for examining the information relating to the product 83 and its associated service plan 75. The validator 100 may receive webpage information from the database 60 or directly from webpage collector 50. The validator may comprise a range checker 101 and a missing service plan locator 105 for validating the product 83 and service plan 75. The range checker 101 can be used with any product 83 having a service plan with a price range for products covered thereunder. For example, a service plan might generally cover products costing between 100-200 dollars. If the pricing information 74 for the product 83 is $240, the range checker 101 would determine the price of the product 83 is outside the range of the plan, optionally notify the crawler 10 of this event, and optionally send the results of its analysis to the interface output 130. The missing service plan locator 105 may analyze products of a particular subcategory 73, and determine whether any of the products in the same subcategory 73 have a service plan, and if the locator 105 determines that at least one of the products does have a service plan, the locator 105 may notify the web crawler 10 as to which products do not have an associated service plan. For example, if a product 83 such as a pink Ipod® Nano® (an MP3 player) has a service plan, but a black Ipod® Nano® does not, the locator 105 will determine that the black Ipod® Nano® is likely missing an associated service plan, and the locator 105 will notify the webcrawler that the black Ipod® Nano® does not have an associated service plan. The locator 105 may inform the crawler 10 of this event, and may send the results of its analysis to the interface output 130. The locator 105 may utilize various algorithms for determining whether a particular product should have a service plan. In a first configuration, the locator 105 may utilize a string distance comparator to determine the Levenshtein distance between two product names 71. The locator 105 may compare the string distance to a preestablished threshold value to enable the locator 105 to determine whether the strings are sufficiently close together such that an inference should be made that if one of the products 83 has a service plan 75, then the second product should have a service plan. For example, if the validator 100 is examining two products (such as an "iPod Nano Pink" and an "iPod Nano Black") and the validator 100 determines that the Pink Ipod has a service and that the Black Ipod does not, the locator 105 may use its string distance comparator to determine the strings have a distance of four, and if the preestablished threshold value is 8 (for example), the locator 105 would determine that the string distance is less that the threshold value, thereby causing the locator 105 to inform the validator 100 (which may send the result to the interface output 130) that the Black Ipod probably should have a service plan 75 because the Pink Ipod has a service plan 75. To take the opposite example, if the locator were comparing a "Ipod Nano Pink" to a "Griffin Aerosport Nano Armband," the locator 105 would determine the string distance is 21, and since 21>8, the locator 105 would not conclude that the Griffin Aerosport Nano Armband should have a service plan. As an additional step, the locator 105 may utilize category and/or subcategory matches to prevent nonsensical matches and deductions. For example, if the website offered both Cadillac cars and Cadillac dog food, the locator 105 may use category and subcategory information to avoid concluding that dog food should come with a service plan, because the Cadillac cars come with a service plan. In a second configuration, the locator 105 may use a Bayesian filter to classify products as having or not having service plan 75. To perform this classification, the locator 105 may be trained to determine which products usually have a service plan 75. To perform this training, the locator 105 may be provided with test data to process. The test data will contain product attributes such as name 71, category 72, price 74, and breadcrumbs 76. From these attributes, the locator 105 can develop a centroid that the locator 105 may use to classify the product 83 by its attributes as one which usually has a service plan 75 or one that does not usually have a service plan 75. The web crawler 10 may also contain a throttle controller 110 which may have a connection limiter 111, a bandwidth limiter 112, and a request limiter 113. Presets for the throttle controller 110 may be defaulted or set through the interface 20. Connection limiter 111 may control the maximum number of simultaneous connections the web crawler 10 or webpage collector 50 may use while crawling the website. For example, the connection limiter 111 may allow 5 simultaneous connections. Bandwidth limiter 112 may control how much data per unit of time the web crawler may download from the website. For example, the connection limiter may limit the download speed to 2 megabytes per second. Request limiter 113 may control the frequency the web crawler sends requests or queries to the website. For example, the request limiter could limit the requester 50 to 20 requests per minute.

The web crawler 10 may also contain an error checker 120 which may have a stopping routine 121, a total error threshold monitor 122, and a frequency error monitor 123. The webserver 205 (FIG. 13), hosting the website 200, may return errors indicating too many webpages 250 were requested, the webpages 250 were requested too quickly, the webpage 250 associated with a particular link 221 or 222 could not be found, etc. The error checker 120 may comprise presets that may be defaulted or set through the interface input 20. Stopping routine 121 can control the crawler 10 or the retriever 50 by preventing either from downloading webpages for a period of time. Total error threshold monitor 122 is designed to monitor the amount of errors received from the website. The monitor may contain a preselected amount of errors per second, and may execute the stopping routine 121 to stop the crawler 10 or retriever 50 if the amount of errors exceeds a threshold value, such as 20 errors. Frequency error monitor 123 may monitor the frequency of errors per unit of time received from the website. The monitor 123 may execute the stopping routine to stop the crawler if the frequency of errors exceeds a threshold value, such as 5 errors/minute.

FIG. 1 also illustrates a process flow of information and interaction between the web crawler 10 and the website 200. While a specific, sequenced process flow is shown in FIG. 1 and described herewith, various steps can be omitted or placed in a differing order than the one shown. Typically, when a user would like to use web crawler to crawl a website, he or she will access the interface input 20. Interface input 20 may request the user enter the URL of the homepage of the website the user would like to crawl. Additionally interface input 20 may request other settings such as throttle, caching, or error settings.

Interface input 20 then may send the information to the smart crawler 30 which downloads the webpage. Smart crawler 30 may utilize its whitelist and/or blacklist to determine whether to process any links on the homepage. The smart crawler 30 then sends the homepage to webpage collector 50. In some embodiments, the smart crawler 30 may send any errors received in conjunction with the homepage to the error checker 120. Error checker 120 may monitor and regulate the actions of the smart controller depending on the amount or frequency of received errors. In some embodiments, the error checker 120 may send the results of its error analysis to the webpage collector 50. Smart crawler 30 also may send bandwidth and network information to the throttle controller 110 which will monitor and regulate the network performance of the smart crawler 30.

Webpage collector 50 may use its categorizer 55 to determine the type of webpage it is currently collecting. If the current webpage being collected is a category 250, subcategory 260 or quasi category 280 webpage, the collector will send a request (and optionally the results of the categorizer's analysis) to the linking system 40, which will access the website 200 to find and process further links to find the SKU webpage 270. Linking 40 system may use its linker 45 and link follower 41 to determine which links to analyze and process. The results of the linking system's analysis are sent back to the smart crawler 30, which downloads the next webpage specified by the linking system 40.

If the webpage now being processed is a webpage 270 or 270' (a SKU or product page), the webpage collector 50 may send the webpage to placement analyzer 90, cacher 99, and/or analyzer 70. Placement analyzer 90 may evaluate the placement and visibility of the service plan, but it may need information from analyzer 70 to inform it of the positioning of the service plan. In some embodiments the analyzer 70 may send both the webpage and the results of its analysis to placement analyzer 90. Cacher 99 may determine whether or not to save or cache the webpage in the database 60. Analyzer 70 may determine the content and location of information such as category 72 or breadcrumbs 76 on the webpage, and then send the results of its analysis to the database 60.

Figure 8:
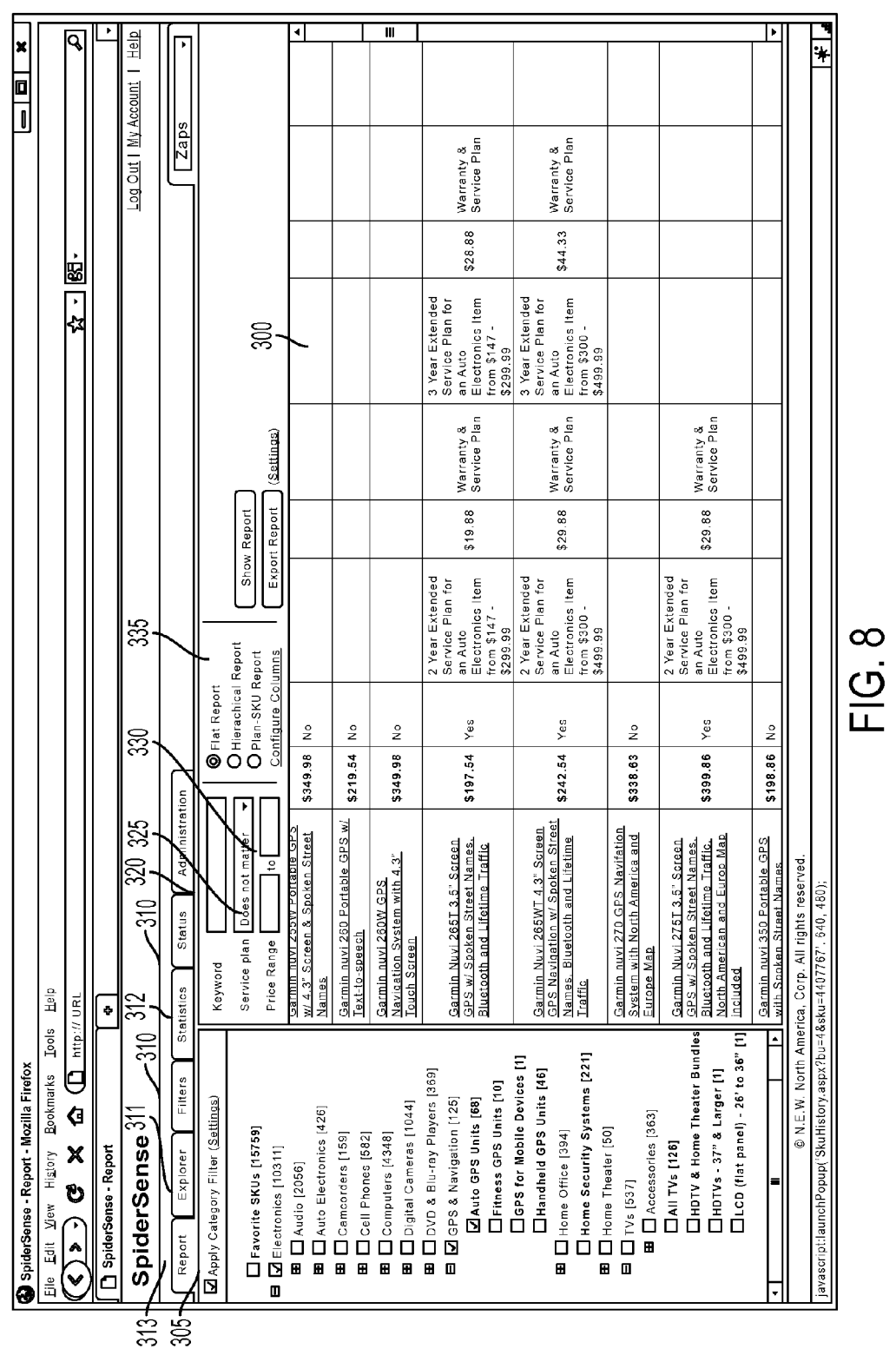
Figure 9:
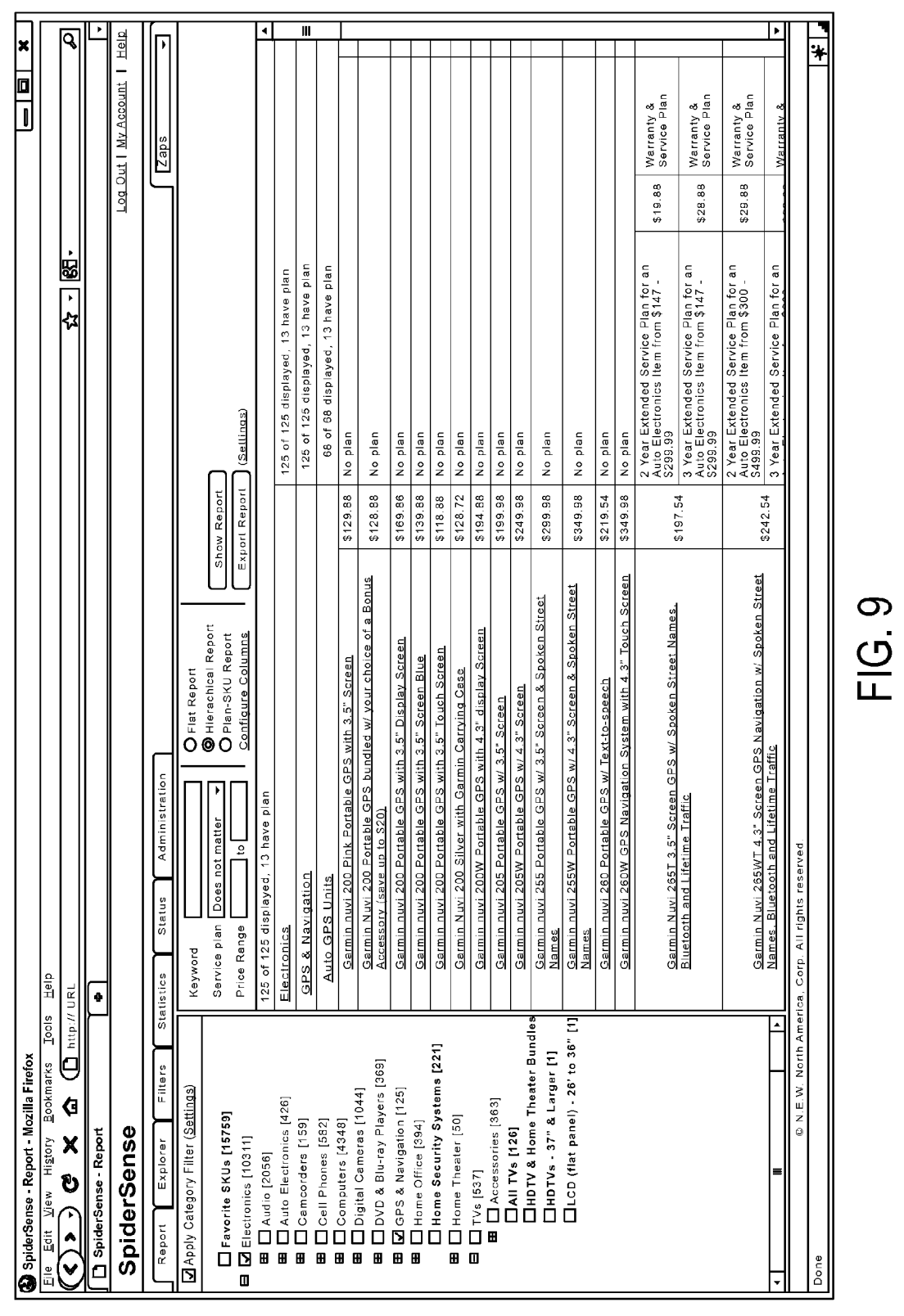
Figure 10:
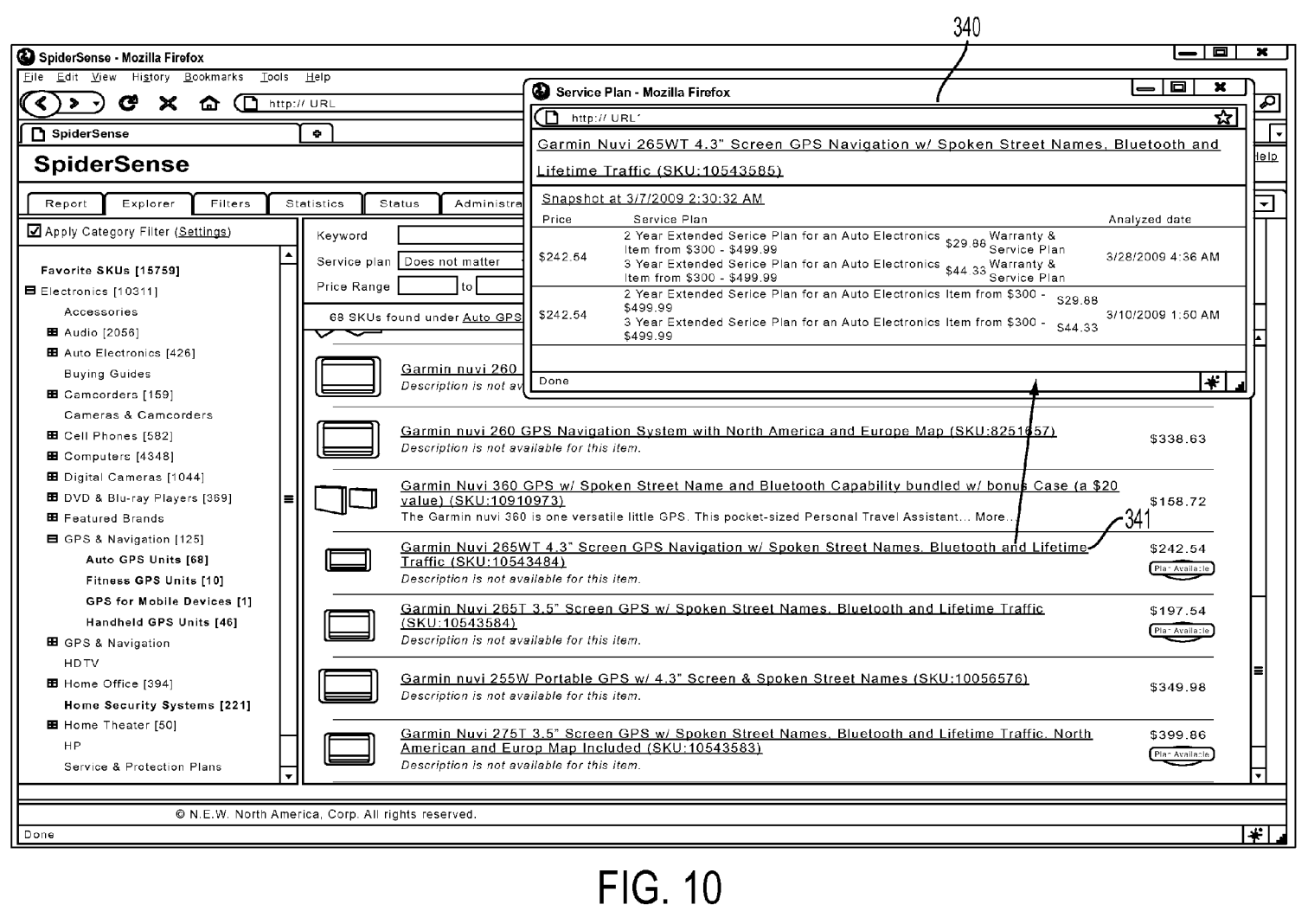
Figure 11:
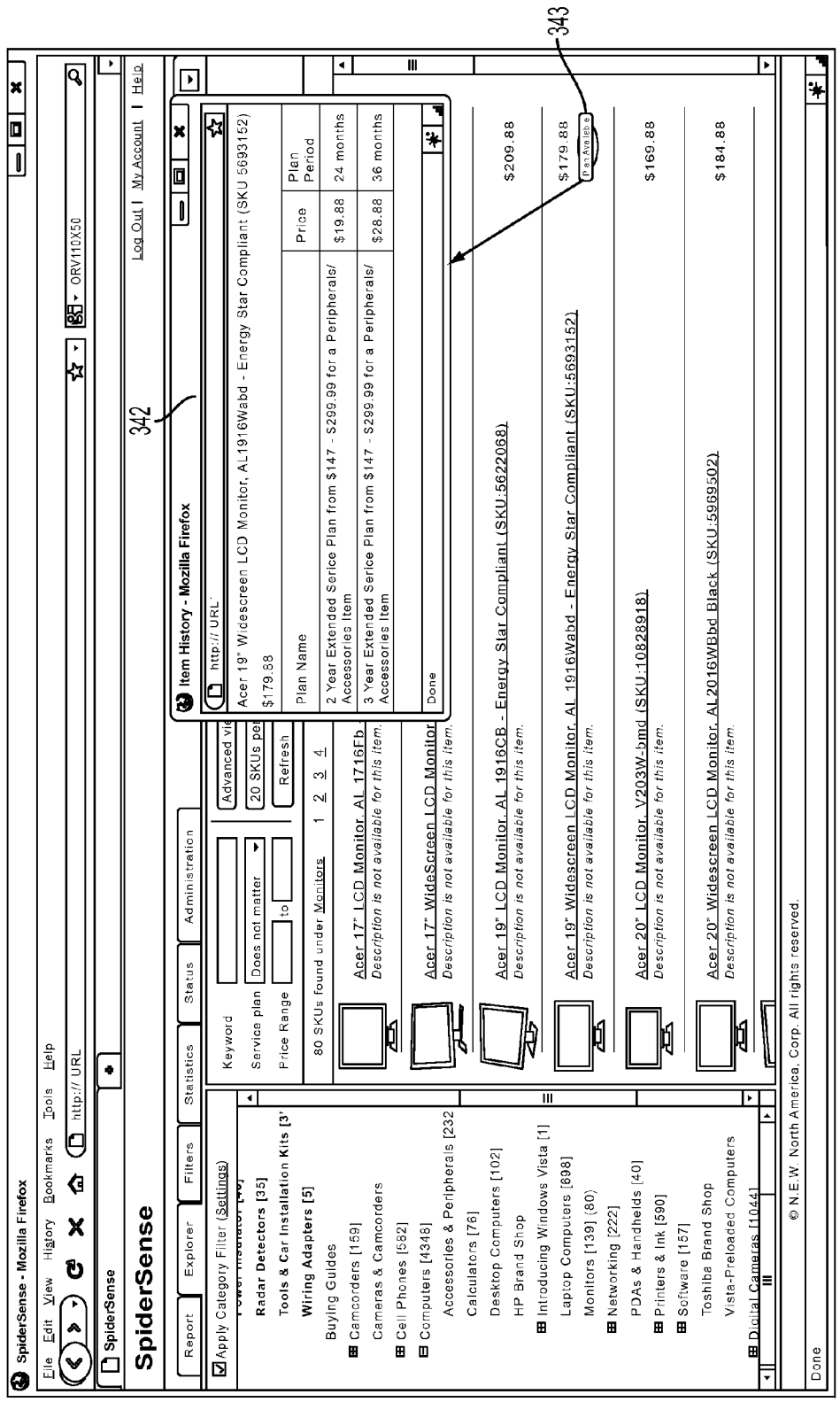
FIG. 11: is a screenshot of an example of the output of the interface output.

Database 60 may use its class generator 93 to create classes for database 60. Tree builder 80 may establish relationships between the classes, and garbage collector 92 may remove blank or not needed classes. Validator 100 may request information from the database 60 (such as objects of the classes created by the class generator) and process the information to determine whether the product on the webpage should have a service plan, and whether the service plan offered is the correct service plan through using the locator 105 and the range checker 101. Validator 100 may then send the results of its analysis to interface output 130. Interface output 130 may generate an output to display the results gathered from the placement analyzer 90 and/or the validator 100 (or other routine). In some case, the computer processing the webcrawler software may transfer the output to a display or a monitor or print the results on paper to inform the user of the results of the analysis performed by web crawler 10. In some embodiments, the details of these results may be customized by the user. FIG. 8 for example shows a flat report of a retailor's (Zaps) website. The report display 300 can show a number of different fields and in some embodiments the contents of the fields or their order can be customized by the user or by the software. In the embodiment shown, there is a description column, a price column, a Yes/No warranty indication column, a first warranty description column, a first price for the warranty column, a first warranty name column, a second warranty description column, a second price for the warranty column, and a second warranty name column. The category filter 305 may allow the interface output 130 to restrict its output to certain categories of items. Category, subcategory, and breadcrumb information may be determined by the analyzer 70 to populate this field. In this embodiment, the flat report view (FIG. 8) has a number of tabs 310 for causing the interface output to switch the current view. These tabs include report 313, explorer 311, filters, statistics 312, status, and administration. This embodiment of the output of the interface output 130 includes a search command 320 for searching for certain terms of keywords in the report display 300. The search command, in this embodiment, can filter by the presence or absence of a warranty (using the warranty filter 325) or by price (using the price filter 330). The report generator function 335 may be used to switch the format of the report display. In FIG. 8, the flat report display is shown, but in FIG. 9, a hierarchical display is shown. Clicking on the radial button, causes the interface output 130 to switch the display format. The hierarchical display (FIG. 9) shows category and subcategory information in the report display. Additionally, in this embodiment, the report display illustrates the number of products available in the present view. In this particular embodiment, a description, price, warranty description, warranty price, and warranty name columns are generated by the interface output 130. One advantage of this layout as compared to the flat layout is that it shows products by their category information, but a disadvantage of this layout is that somewhat less detailed information about the warranty is displayed by interface output 130. Clicking on the explorer tab 311 instructs the interface output 130 to display the explorer interface (see FIG. 10). This interface provides additional information about the product being sold, and through popup windows provides detailed views of warranty information. FIG. 10 shows the first warranty window 340 the interface output 130 generates when the product hyper link (341) is clicked. FIG. 11 shows the second warranty window 342 the interface output 130 generates when the warranty icon 343 is clicked. Clicking the statistics tab 312 instructs the interface output 130 to display the statistics output (FIG. 12.) In this example, crawling activity on Zaps webpage is shown. Various types of information is compiled and illustrated by the interface output 130 in this view. For example, the number of products having warranties can be calculated, the amount data pulled from the merchant's website can be displayed (this data may come from the throttle controller 110 for example), and the total number of webpages downloaded can be displayed.

The webcrawler 10 may be used to determine which products on a merchant's website have or should have warranties or service plans, and which products are correctly paired with the warranty or service plan. Once a user learns this information, he or she may relay it to the merchant (in some embodiments the merchant may be able to use the software directly). In such a case, the merchant may still need to have personnel update the merchant's website to add the missing warranties or service plans and update the incorrectly paired warranties or service plans.

One way to avoid having to pay personnel to update mismatched or missing service plans is to build a system which automatically selects a correct service plan when a product webpage is updated or added to a merchant's website 200. A dynamic mapper may be used to select which service plan should be paired with a particular product. The dynamic mapper may be stored on computer readable media and comprise instructions for causing a processor of a computer to execute the instructions, thereby creating an instance of the dynamic mapper. The computer may contain a processor, hard drive, motherboard, I/O connections, memory, or other typical hardware.

As shown in FIG. 13, in one embodiment for adding a dynamic mapper to a merchant's website involves adding a control 400 onto a product webpage 410, search page, or shopping cart. Then, when a consumer views the product—or adds it to the shopping cart—the control 400 may send a request S400 including the product name, price, category, SKU breadcrumbs, and/or other information to a service plan server 420, to instruct a processor 421 in the server 420 to lookup S402 which service plan should be associated with the particular product by accessing a database 422. The processor 421 returns S410 electronic data back to the control 400. The electronic data may simply be html code which allows the control 400 to display warranty information or provide a selector to choose among multiple service plans (2 yr or 3 yr plans for example). In other configurations, the electronic information may include a sales pitch, service plan options, or an advertisement. The control 400 may display and/or process the electronic data so that the product webpage 410 and control 400 appear to be one integral page. Alternatively, the control 400 may store the electronic data locally, and send a request for updated information from the service plan server 420 when certain conditions are met. Such requests may be sent after a predetermined period of time elapses (e.g. once a year), or anytime the product information is modified. The electronic data may contain text, images, videos, popup panels, and other types of rich media. The control 400 may support chat functions to allow customers to ask questions about a service. If a customer wants to purchase the service plan, he or she may have the option to click a purchase button to add the service to their shopping cart. In a way, the content returned by the dynamic mapper may act like part of the underlying webpage; as opposed to a banner type advertisement. One way to allow a user to update his or her order, is to construct the control 400 so that the control 400 sends a request to the webserver 205 hosting the webpage when the user clicks a button or other element in the control. The request S420 sent by the control 400 to the webserver 205 may contain information to allow the webserver 205 to display S425 updated information such as a new combined price.

The dynamic mapper may also track customer behavior and sales outcome to determine a success rate of different embodiments of the control 400. To do so, the webserver 205 may store S435 the outcome of what happens in a webserver database 430 when alternative embodiments of the control 400 are used (sales pitch, radial box with options, chat popup, etc). In other words, the webserver database 430 may store a consumer's decision whether or not to purchase a service plan advertised through the control 400. For example, when the consumer presses a "Buy" button 401, the consumer's computer may submit S430 information to the webserver 205 including the service plan selected, the current embodiment of the control 400, and perhaps the total price. An analysis engine 435 may process this information, and determine which embodiments of the control 400 are more effective in persuading customers to purchase the service plan. In some configurations, the analysis engine 435 may take into account information about the purchaser including the location of the purchaser (obtainable from the purchaser's IP address), the merchant from which the customer is purchasing the item, the time of day or year of the purchase (during the workday or at Christmas time for example.) Moreover, if the merchant's website or the customer sends information about the customer to the webserver 205 or analysis engine 435 (such as the customer's phone number) this information can be crossreferenced against a database to obtain additional information about the customer including gender, income, age, etc. The dynamic mapper may use this information to determine which type of advertisement for the service provider is most effective for the particular customer to maximize sales of the product and/or the service plan. The analysis engine may send S440 an instruction back to the webserver to direct the webserver as to which type of control 400 to use to optimize the likelihood that a particular customer will purchase the service plan.

The service plan server 420 may use Bayesian algorithms, statistical analysis, rule-based engines, or other techniques to identify which service plans should be associated with a given product. Based on these techniques, the service plan server may determine what type of advertisement it should display to the customer, and return this advertisement to the control 400.

The dynamic mapper may also be constructed so that the control 400 downloads dynamic content only after the product webpage 410 has been displayed to the customer. This prevents the advertisement for the service plan from increasing page load time. This may be significant as an increase in page load time may decrease sales of the underlying product. Additionally, the dynamic mapper may be constructed so that the control 400 cannot modify the underlying product webpage. This may be a valuable security benefit to the merchant. Additionally, if the control is restricted to a particular area of the webpage, a failure of the dynamic mapper to return the advertisement may cause displayer to display nothing, thereby making this failure transparent to a customer.

Figure 14A:
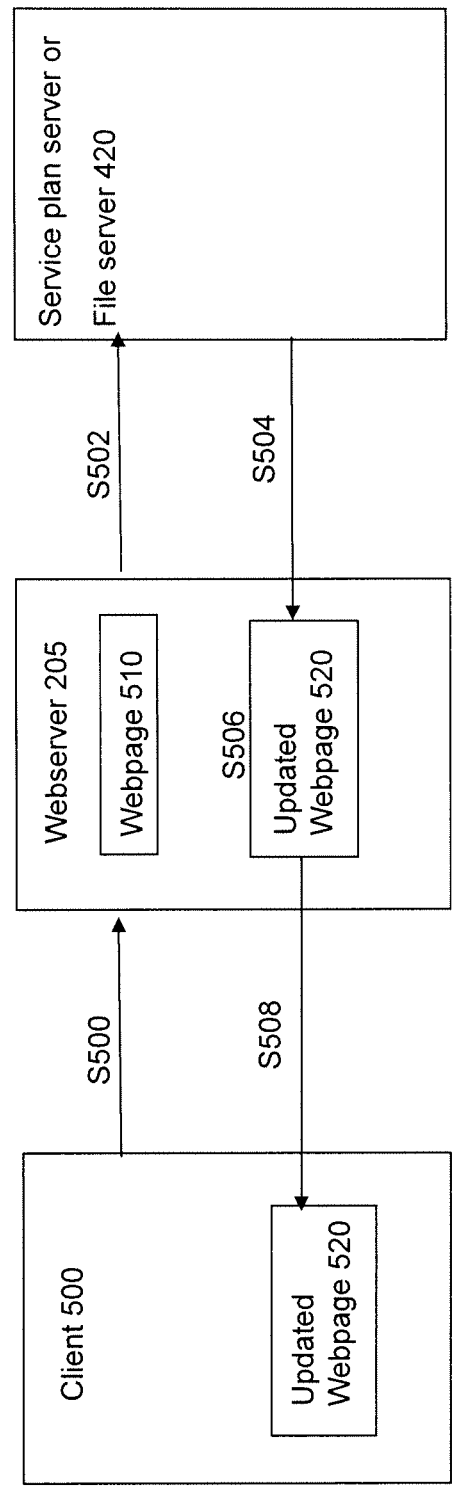
FIG. 14A: is a flow diagram illustrating how information may be sent between a client, webserver, and file server.

FIGS. 14A-E show how information may be delivered to a client. In FIG. 14A, a client 500 (utilizing a web browser) may send S500 a request to a webserver 205 for a particular webpage adverting a particular product. The webserver 205 may determine the webpage 510 which is being requested, and may send S502 a request to the service plan server 420 to update the service plan information stored in the webserver 205 for the particular product. The service plan server 420 may determine attributes about the service plan and send S504 a service plan in the form of an executable program to the webserver 205 (although data may be sent instead or in addition). The webserver 205 may update S506 the webpage, and then send S508 the updated webpage 520 to the client 500. While this approach works, it has several short-comings. First, this process will increase the amount of time it takes for the client to obtain the information, because it can take several seconds for the webserver 205 to negotiate the connection with the service plan server 420. Second, sending a program (or other executable code (javascript, applets, etc.)) from the service plan server 420 exposes the webserver and the client to potential security risks. For example, a rogue employee working at the service plan server 420 could send malicious code to the webserver 205. Or, a third party could hack into the service plan server 420 to transmit the malicious program. Recognizing the weaknesses in the FIG. 14A's model, the following multistep approaches were devised.

Figure 14B:
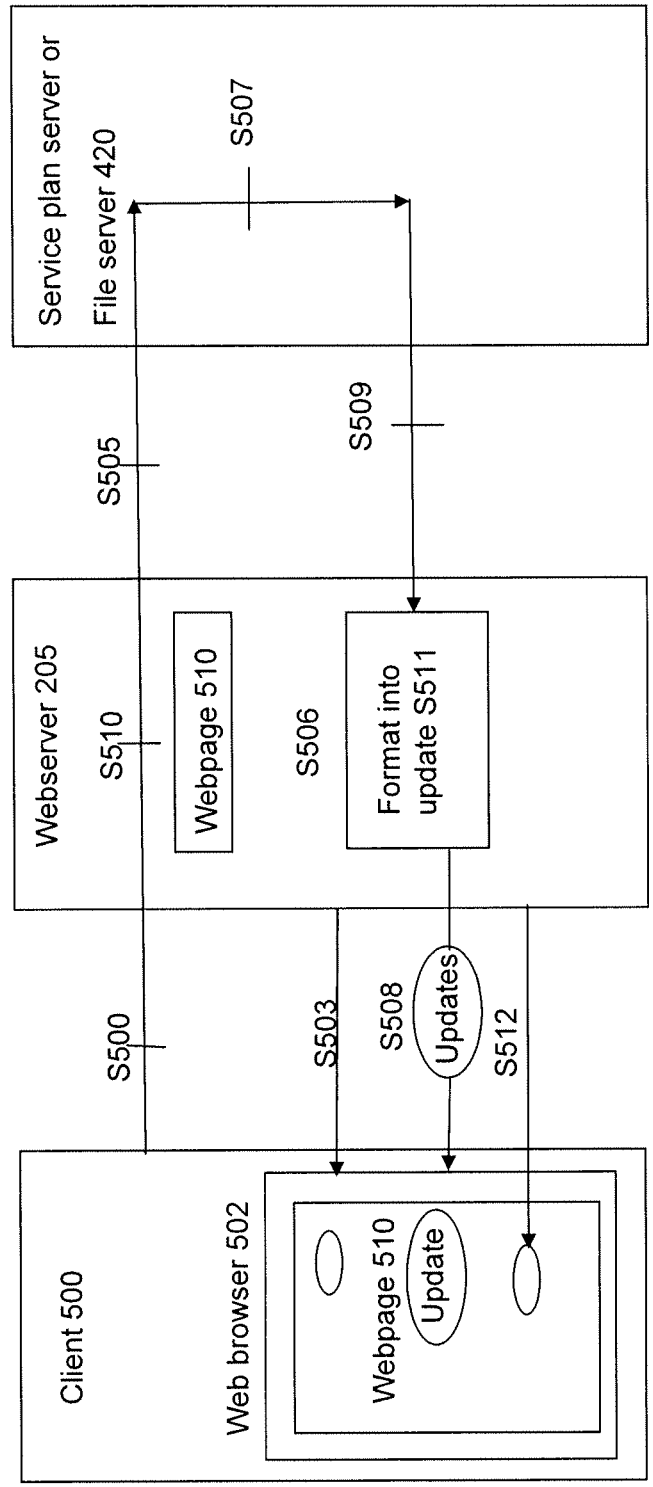
FIG. 14B: is a flow diagram illustrating a second embodiment of how information may be sent between a client, webserver, and file server if the client's web browser can be configured to natively accept asynchronous page loading.
Figure 14C:
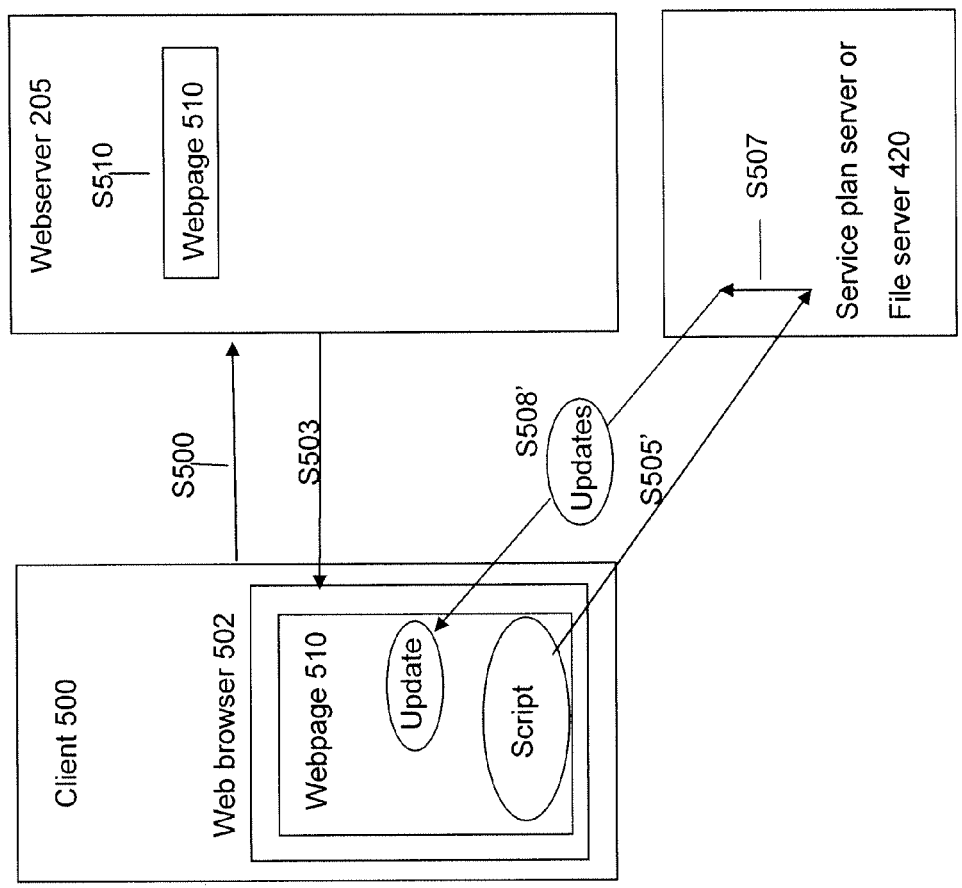
FIG. 14C: is a flow diagram illustrating a third embodiment of how information may be sent between a client, webserver, and file server if the client's web browser can be configured to natively accept asynchronous page loading.

FIGS. 14B and 14C show a process and system which utilizes asynchronous page loading. In general, older web browsers are not configured to accept asynchronous page transmissions. As shown in FIG. 14B, a client 500 having a web browser 502 may send a request to a webserver 205 to send a webpage 510 having information on one or more products, images, and service plan information (in other configurations the webpage could contain information on news, sports, entertainment etc). When the request is sent, the webserver 205 may review the query string parameters (information included with the URL to provide server additional information) included within the client's request for the webpage 510. Using HTTP request headers, the webserver may be able to determine S510 the version and type of the browser making the request, and from that information, determine whether the browser supports asynchronous page loading. In alternate configurations, the webserver 205 may transmit a webpage to the client which contains a script (see FIG. 14C). This script may attempt to send a request S505' to the service plan server 420 to update the webpage, if this procedure succeeds, an embodiment related to FIG. 14C may be followed. (FIGS. 14D and E illustrate examples of configurations of process flows if the script fails or the web browser does not support asynchronous page updating.)

If the browser supports asynchronous page loading (such as IE 8 or Firefox 3), the web browser may be able to receive updates to a webpage as the web browser is displaying the webpage. Under this approach, the webserver 205 may send S503 the webpage to the client 500 and an update request S505 to the service plan server 420. The service plan server 420 may lookup S507 the requested information, and transmit S509 the retrieved information back to the webserver 205. The webserver may receive the information from the server, format it S511 into an update for the client, and transmit S508 the update to the client. Under this model (FIG. 14B), the client 500 can view product information on the webpage 510 quickly, while the service plan server sends updates for the webpage. Updates (shown schematically as ovals) may be implemented in any portion of the webpage and are not necessarily localized to a particular portion of the webpage. Images and other items having a large file size may also be sent asynchronously via update S512.

In FIG. 14C, the webserver 205 may send a webpage 510 containing a script (e.g. a java script for instructing the web browser 502 to request additional information from a service plan server 420) to the client. The web browser 502 may transmit S505' information about a particular product so the service plan server 420 can determine which service plan information to look-up. Once the service plan is determined, the service plan server 420 can send S508' service plan information back to the client 500. Either FIG. 14B or 14C may be used to update a client webpage asynchronously. One advantage to FIG. 14B is that the information that the client receives may appear to originate from the webserver 205. This is effective in overcoming ad-blocking technology which may prevent $3^{rd}$ party webservers from adding content to a webpage. Additionally, the embodiment of FIG. 14B may be effective in distributing information to clients which have their web browser 502 settings set to high levels. Advantages of the topology of FIG. 14C include reduced load time for information in the server plan server 420 because the information does not need to be sent through the webserver 205. Additionally, the topology of FIG. 14B requires the webserver to handle more processing tasks which may require more powerful webservers to implement.

Figure 14D:
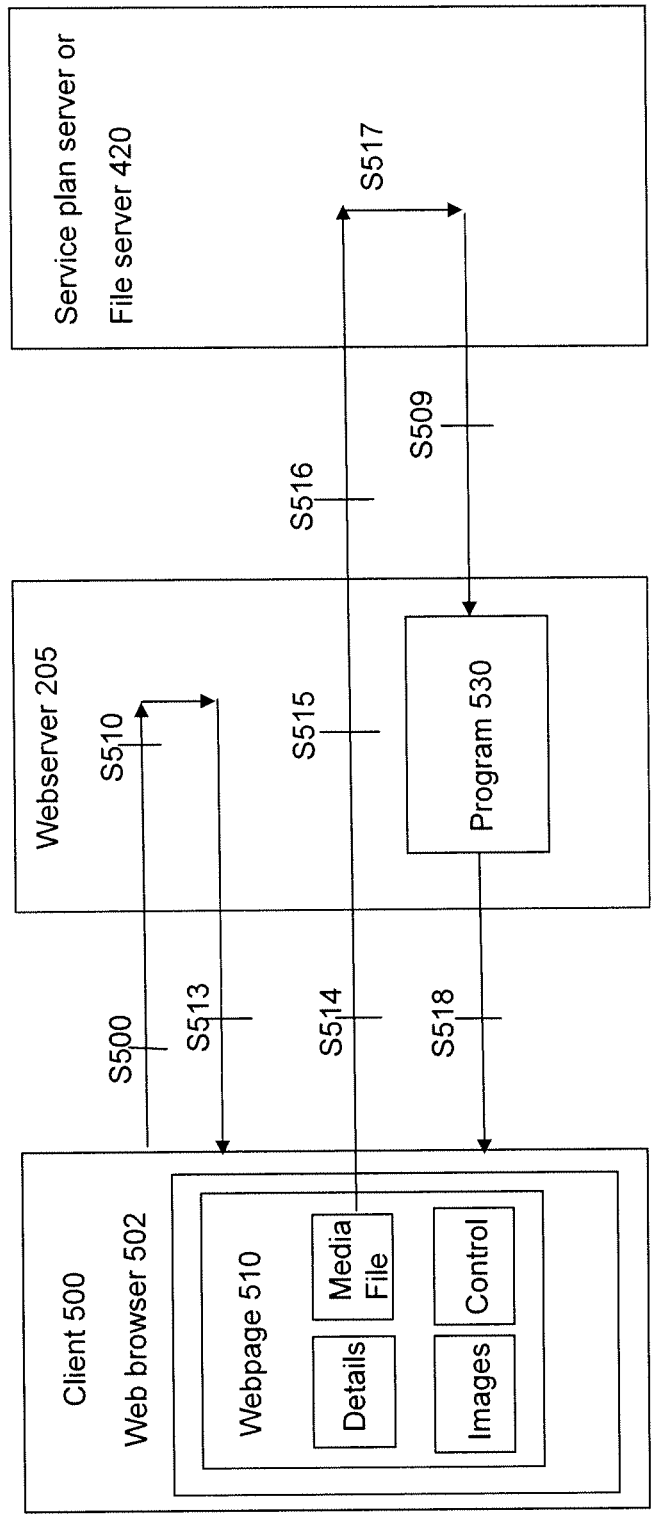
FIG. 14D: is a flow diagram illustrating an embodiment of how information may be sent between a client, webserver, and file server if the client's web browser does not natively accept asynchronous page loading.

FIGS. 14D-14E illustrate two embodiments of a webserver process flow for a client that has a web browser which does not support asynchronous page loading (e.g. IE 3 or Firefox 1). In FIG. 14D, the webserver 205 may send a request 5513 to determine whether a particular media player (e.g. Adobe Flash Media Player, Microsoft Silverlight, etc.) is installed. If the media player is installed, the webserver 205 can send S503 a webpage 510 containing a media file (e.g. a Flash movie) to the client 500. The media file may be very small and may be placed in a remote location of the webpage 510 so that it is unlikely an individual looking at the webpage will see it. The media file may also be very small in file length (<100 k) and movie length (<1 second). In this step, the transmitted webpage may contain details about the product, possibly images, the media file, and a control. In some embodiments, the control may be written using Java script, an applet, or other programming code. The control may be configured so that it awaits information from the webserver 205 to cause the program to execute and display some type of service plan information.

As shown in step S514 (FIG. 14D), the program executing the media file may send S514 a request for additional information to webserver 205 (e.g. updated service plan information). Alternatively, the request may be sent directly S514' to the service plan server 420. In FIG. 14D, the webserver 205 may receive S515 the request, and send S516 its own request to the service plan server 420 to lookup S517 service plan information concerning the product the client is viewing. Once the service plan server 420 fetches the needed service plan information (utilizing the techniques explained above, rule engines/Bayesian filters, etc.), the server 420 may format the results it obtains (e.g. using XSLT template), and return S518' data or information back to the webserver 205. To address security concerns that the service plan server 420 may send the webserver 205 a malicious program, the webserver 205 and service plan server 420 may be configured so that the service plan server 420 only sends data (for example XML code and XSLT template) to the webserver 205 (the webserver 205 may be configured only to receive data, i.e. not program code). The webserver 205 may contain a program for accepting the data. The webserver 205 may also contain a program 530 which will use the received data to generate an executable program, which the webserver 205 can send S518 to the client 500. In some embodiments, the webserver 205 may also send S518 the information (e.g. XML and XSLT) to the client 500. In the former option, once the client 500 has the executable program 530, the browser can cause the program to be executed thereby displaying the service plan information. In the latter option, the information may be passed to the control and be executed by the control to display the service plan information. Also, the service plan server 420 may send the information or program directly to the client 500 (FIG. 14E).

The configurations illustrated and described in FIG. 14A-E may used independently or combined into a single multistep system/method. For example, the process/system illustrated and described in conjunction with FIGS. 14A, B, and D could be combined into a multistep system/process. Namely, the webserver 205 could determine whether the browser of the client 500 natively supports (either as installed or with add-ins or extensions) asynchronous page loading. If so, the webserver 205 could implement the model shown and described in conjunction with FIG. 14B. If asynchronous page loading is not supported, the webserver 205 could send a webpage containing a script for determining whether a particular media player is installed. If so, the webserver 205 could implement the model shown and described in conjunction with FIG. 14D. If Adobe Flash is not installed (and the browser does not natively support asynchronous page loading), the webserver 205 could implement the model shown and described in conjunction with FIG. 14A. Similarly, the process/system illustrated and described in conjunction with FIGS. 14A, C, and E could be combined into a multistep system/process. Namely, the webserver 205 could send a webpage 510 to the client 500 containing a script. The script could attempt to update the webpage via a third party service plan server 420 (FIG. 14C). If the script fails because asynchronous page updating is not supported (or is disabled), the script could attempt to use a media player to update the content of the webpage (FIG. 14E). If that attempt fails because the media player is not installed, for example, the process of FIG. 14A could be followed. One advantage to using these multi-tiered processes is that these processes identify an efficient way to deliver an updated webpage 520 to the client depending on the software (web browser, media player) installed on the client.

Although the preceding description of FIG. 14A-E referenced in some locations a system and method designed for updating service plan information in relation to a product listing hosted on a webserver 205, the preceding technology may be adapted to a number of general technical areas/uses. For example, in alternative configurations the service plan server 420 may be a generalized file server containing a database of information of interest to the client 500 or webserver 205. The webserver 205 may be able to send a first version of a webpage to the client, while the file server sends updates to the webpage to the client 500. Additionally, the preceding technology may be adapted to allow webserver 205 to update the webpage as data in the server 420 changes. For example, sports scores or stock prices may be updated on a webpage using this technology without the client refreshing the webpage. In some embodiments the server 420 may alert the webserver 205 that it contains updated information and push new data to the webserver 205.

The current assignee of the present application was recently awarded an award by the Consumer Electronics Association for the technology described in the provisional application 61/245,923; and 61/272,707 (incorporated by reference). The Consumer Electronics Show (an annual awards presentation produced by the Consumer Electronics Association) reviewed a description of the technology underlying this patent application and awarded National Electronic Warranty Company (the current Assignee of this patent application) the "Design and Engineering Showcase Award for 2010. See New Corp's award in the IDS being filed on the same day as this application. CEA grants this award to the company which produces the most innovative developments in "online retail" technology. Also in the IDS are copies of a webpage from CEA announcing the award (currently listed on the web at http://www.cesweb.org/awards/innovations/2010honorees.asp?category=931397), and a copy of a webpage from NEW Corp discussing the award (currently listed on the web at http://www.businesswire.com/portal/site/home/permalink/?ndmViewId=news_view&newsId=20100105006253&newsLang=en). Consumer Electronics Association is widely regarded as one of the preeminent consumer electronics review organizations in the world, and CEA's decision to award NEW Corp with the award is evidence of the novelty and unobviousness of the below claimed invention. These three documents are hereby incorporated by reference in their entirety.

The invention may be embodied in other specific forms without departing from the spirit or essential characteristics thereof. The present embodiments are therefore to be considered in respect as illustrative and not restrictive; the scope of the invention being indicated by the appended claims rather than by the foregoing description, and changes which come within the meaning and range of the equivalency of the claims are therefore intended to be embraced therein.

It is claimed:

1. A web crawler stored on non-transitory computer readable media for causing a processor of a computer to crawl a website having a webpage displaying a product, said web crawler comprising:
   a. an interface input for receiving a URL of a homepage of the website, said homepage containing links;

b. a linking system containing a link follower for retrieving and following the links on the homepage which leads to an additional webpage in the website;
c. a webpage collector for collecting the homepage and a current webpage associated with at least one of the links retrieved from the linking system; wherein the collector categorizes each homepage and webpage collected;
d. an analyzer for collecting at least one of the following: a name of the product, a category and subcategory of the product, pricing information on the product, pricing information relating to a service plan of the product, breadcrumbs, and images of the product;
e. a validator for examining webpage information including product information and the product's associated service plan;
   wherein the validator comprises a range checker for service plans having price ranges for products covered under said service plans; said range checker containing:
   instructions to cause the web crawler to determine whether a price of the product is within the price range of the service plan; and
f. an interface output for generating an output containing results generated by the web crawler.

2. The web crawler of claim 1 comprising a linker for determining whether a particular link from the homepage should be followed by determining whether at least a part of a link's URL matches a regular expression.

3. The web crawler of claim 2, wherein the regular expression is "category" or "product ID."

4. The web crawler of claim 1, comprising a relational database for storing the webpages collected by the webpage collector.

5. The web crawler of claim 1 wherein the analyzer comprises a class generator for generating classes in a database based upon information from the webpage; wherein the generator creates at least one of a merchant class, category class, subcategory class, quasi category class, SKU class, SKU warranty class, page link class, page content class, category display filter class, category spider filter class, or statistical data class.

6. The web crawler of claim 1 wherein the analyzer comprises a tree builder for constructing a relationship tree for establishing relationships between categories, and locating parent categories.

7. The web crawler of claim 6 wherein the tree builder is configured to link at least one of:
a. a merchant class to a category class and a page link class;
b. a category class to a subcategory class and a quasi category class;
c. a subcategory class and a quasi category class to a SKU class;
d. a SKU class to a SKU warranty class; or
e. a page link class to a page content class.

8. The web crawler of claim 1 comprising a placement analyzer for determining placement of the service plan on the current webpage.

9. The web crawler of claim 8 wherein the placement analyzer contains:
a. instructions for evaluating and rating the service plan's visibility on the current webpage;
b. an output for sending results to the interface output; and
c. a simulator for simulating human interaction with the webpage to enable the placement analyzer to locate placement of the service plan on the SKU webpage, in a shopping cart, or in a popup window.

10. The web crawler of claim 9 wherein the placement analyzer contains a routine for sending its results to the interface output, and said interface output contains a routine for displaying the results of the placement analyzer.

11. The web crawler of claim 1 wherein the validator comprises: a missing service plan locator containing instructions for causing the validator to:
a. analyze products of a particular subcategory;
b. determine whether any of the products in the subcategory have a service plan; and
c. if the locator determines that at least one of the products does have a service plan, send results to the interface output.

12. The web crawler of claim 1 comprising a smart crawler for crawling the current webpage.

13. The web crawler of claim 12 wherein the smart crawler comprises:
a. a matcher having a blacklist routine for matching a list of blacklisted items against the breadcrumbs collected by the analyzer; and
b. a halter which, if any item in the blacklist matches a breadcrumb, causes the smart crawler to download the current webpage in a database, and to instruct the linking system to avoid following any further links from the current webpage.

14. The web crawler of claim 12 wherein the smart crawler comprises:
a. a matcher having a whitelist routine for matching a list of whitelisted items against the breadcrumbs collected by the analyzer; and
b. a halter which, if no items in the whitelist match a breadcrumb, prevents the smart crawler from saving the current webpage in a database, and instructs the linking system to avoid following any further links from the current webpage.

15. The web crawler of claim 1 comprising a webpage cacher for caching webpages collected by the webpage collector.

16. The web crawler of claim 1 comprising a throttle controller for managing the web crawlers impact and strain on the website.

17. The web crawler of claim 16, wherein the throttle controller contains:
a. a connection limiter for controlling a maximum number of simultaneous connections the web crawler may use while crawling the website;
b. a bandwidth limiter for controlling how much data per unit of time the web crawler may download from the website; and
c. a request limiter for setting how frequently the web crawler sends requests to the website.

18. The web crawler of claim 1 comprising an error checker for tracking errors returned by the website.

19. The web crawler of claim 18 wherein said error checker contains:
a. a stopping routine for stopping the web crawler for a period of time;
b. a total error threshold monitor for monitoring an amount of errors received from the website, said monitor executing the stopping routine to stop the web crawler if the amount of errors exceeds a threshold value; and
c. a frequency error monitor for monitoring a frequency of errors per unit of time received from the website, said monitor executing the stopping routine to stop the web crawler if the frequency of errors exceeds a threshold value.

20. A web crawler stored on non-transitory computer readable media for causing a processor of a computer to crawl a website having a webpage displaying a product, said web crawler causing the computer to perform the steps of:
   a. receiving a URL of a homepage of the website, said homepage containing links;
   b. downloading the homepage;
   c. retrieving and following the links on the homepage;
   d. determining whether a particular link from the homepage should be followed, by using a regular expression to determine whether at least a part of a link's URL matches at least part of a particular phrase;
   e. retrieving a current webpage associated with at least one of the retrieved links;
   f. collecting at least one of the following: a name of the product, a category and subcategory of the product, pricing information on the product, pricing information relating to a service plan of the product, breadcrumbs, and images of the product;
   g. providing a validator for examining webpage information about a product and its associated service plan, wherein the validator executes a range checker for service plans having price ranges for products covered under said service plans, the range checker determining whether a price of the product is within the price range of the service plan; and
   h. outputting results from the validator to a display.

21. The web crawler of claim 20 wherein the phrase is "category," "subcategory," "product ID," or "catprop."

22. The web crawler of claim 20 comprising the step of generating classes in a database based upon information from the webpage; wherein at least one of the classes is a merchant class, category class, SKU class, SKU warranty class, page link class, page content class, category display filter class, category spider filter class, or statistical data class.

23. The web crawler of claim 20 comprising the step of constructing a relationship tree for establishing relationships between categories, and locating parent categories.

24. The web crawler of claim 23 wherein the relationship tree is constructed so as to link at least one of:
   a. a merchant class to a category class and a page link class;
   b. a category class to a subcategory class and a quasi category class;
   c. a subcategory class and a quasi category class to a SKU class;
   d. a SKU class to a SKU warranty class; and
   e. a page link class to a page content class.

25. The web crawler of claim 20 comprising the step of determining placement of the service plan on the current webpage.

26. The web crawler of claim 20 comprising the step of determining the service plan's visibility on the current webpage.

27. The web crawler of claim 20 comprising the step of simulating human interaction with the website to enable the web crawler to locate placement of the service plan on a SKU webpage, in a shopping cart, or in a popup window.

28. The web crawler of claim 20 comprising the steps of using the validator to analyze products of a particular subcategory and to determine whether any of the products in the subcategory have a service plan; using a locator to determine whether at least one of the products has a service plan; and, if the locator determines that at least one of the products had a service plan, using the validator to notify the web crawler as to which products do not have an associated service plan.

29. The web crawler of claim 20 comprising the step of matching a list of blacklisted items against the collected breadcrumbs, and, if any item in the blacklist matches a breadcrumb, causing the smart crawler to download the current webpage and instructing the web crawler to avoid following any further links from the current webpage.

30. The web crawler of claim 20 comprising the step of caching webpages retrieved by a webpage collector.

31. The web crawler of claim 20 comprising the step of providing a throttle controller for managing the web crawler's impact and strain on the website; said throttle controller performing the steps of: setting a maximum number of simultaneous connections the web crawler may use while crawling the website; setting how much data per unit of time the web crawler may download from the website; and setting how frequently the web crawler sends requests to the website.

32. The web crawler of claim 20 comprising the step of providing an error checking routine for tracking errors returned by the website, said error checking routine performing the steps of: monitoring an amount of errors received from the website, and stopping the crawler if the amount of errors exceeds a threshold value; and monitoring a frequency of errors per unit of time received from the website, and stopping the crawler if the frequency of errors exceeds a threshold value.

33. The web crawler of claim 20 comprising the step of outputting results from a placement analyzer to a display.

* * * * *